United States Patent
Choudhary et al.

(10) Patent No.: US 10,809,149 B2
(45) Date of Patent: Oct. 20, 2020

(54) APPARATUS AND METHOD FOR GENERATING A MOTIONAL SIGNATURE INDICATIVE OF MOTION OF MOVING PARTS OF A TARGET MACHINE

(71) Applicant: IMPERIAL COLLEGE INNOVATIONS LIMITED, London (GB)

(72) Inventors: Babu Devnarayan Choudhary, London (GB); Julie Ann McCann, London (GB)

(73) Assignee: IMPERIAL COLLEGE INNOVATIONS LIMITED, London (GB)

(*) Notice: Subject to any disclaimer, the term of this patent is extended or adjusted under 35 U.S.C. 154(b) by 19 days.

(21) Appl. No.: 16/315,763

(22) PCT Filed: Jun. 28, 2017

(86) PCT No.: PCT/GB2017/051885
§ 371 (c)(1),
(2) Date: Jan. 7, 2019

(87) PCT Pub. No.: WO2018/007790
PCT Pub. Date: Jan. 11, 2018

(65) Prior Publication Data
US 2019/0257711 A1    Aug. 22, 2019

(30) Foreign Application Priority Data
Jul. 8, 2016  (GB) .................................. 1611894.5

(51) Int. Cl.
*G01M 5/00*    (2006.01)
*G01P 13/00*    (2006.01)
(Continued)

(52) U.S. Cl.
CPC .......... *G01M 5/0091* (2013.01); *G01P 13/00* (2013.01); *H04B 17/0085* (2013.01); *H04B 17/20* (2015.01); *H04L 1/206* (2013.01)

(58) Field of Classification Search
CPC .... H04B 17/00; H04B 17/0085; H04B 17/20; H04B 17/27; H04L 1/20; H04L 1/206; (Continued)

(56) References Cited

U.S. PATENT DOCUMENTS 3,681,978 A    8/1972   Mathias et al.
6,914,552 B1 *  7/2005   McEwan ............. G01S 13/0209
                                         342/193

(Continued)

FOREIGN PATENT DOCUMENTS

CN    102156282    8/2011
CN    102187248    9/2011
(Continued)

OTHER PUBLICATIONS

International Search Report and Written Opinion of the ISA for PCT/GB2017/051885, dated Nov. 7, 2017, 18 pages.
(Continued)

*Primary Examiner* — Young T Tse
(74) *Attorney, Agent, or Firm* — Nixon & Vanderhye P.C.

(57) ABSTRACT

The present technique provides an apparatus comprising receiver circuitry to receive a signal formed from a plurality of multipath signal components, including a first set of multipath signal components that have been subjected to modulation by interaction with at least one moving part of a target machine. The first set of multipath signal components have time varying signal paths due to the interaction
(Continued)

with said at least one moving part. Evaluation circuitry is used to generate, for at least one property of the received signal, an evaluation signal, and modification circuitry then produces a modified evaluation signal by applying a removal operation to at least partially remove from said evaluation signal a contribution to that evaluation signal from the multipath signal components whose associated signal paths are non-time-varying. Thereafter processing circuitry performs one or more processing operations on the modified evaluation signal to produce a motional signature indicative of the motion of said at least one moving part.

23 Claims, 10 Drawing Sheets

(51) Int. Cl.
*H04L 1/20* (2006.01)
*H04B 17/00* (2015.01)
*H04B 17/20* (2015.01)

(58) Field of Classification Search
CPC ........ G01M 5/0091; G01M 7/00; G01M 7/02; G01M 7/06; G01P 13/00
USPC ....... 375/224, 259, 260, 267, 268, 279, 316, 375/320, 329, 340, 347, 349; 370/310.02, 370/328; 455/67.11, 67.13, 67.14, 143
See application file for complete search history.

(56) References Cited

U.S. PATENT DOCUMENTS

| | | |
|---|---|---|
| 2012/0242537 A1 | 9/2012 | Kluczewski |
| 2013/0139597 A1 | 6/2013 | Lin et al. |
| 2014/0152451 A1 | 6/2014 | Murphy |
| 2015/0112640 A1 | 4/2015 | Niro et al. |
| 2015/0356332 A1* | 12/2015 | Turner ................. G01S 5/0226 340/10.5 |
| 2016/0165643 A1* | 6/2016 | Li .......................... G06F 3/017 370/328 |

FOREIGN PATENT DOCUMENTS

| | | |
|---|---|---|
| CN | 102576070 | 7/2012 |
| CN | 204988220 | 1/2016 |
| EP | 2 190 212 | 5/2010 |
| GB | 2322988 | 9/1998 |
| WO | 98/39670 | 9/1998 |
| WO | 2004/090485 | 10/2004 |

OTHER PUBLICATIONS

Combined Search and Examination Report for GB1611894.5, dated Nov. 28, 2016, 8 pages.
Office Action for CN Application No. 201780041267.7 dated Jun. 4, 2020 (no English translation available), 20 pages.
Z. Huanxin et al, "Radar Modulation Characteristics of Periodic Moving Components" *Systems Engineering and Electronics*, vol. 22, No. 6, Dec. 31, 2000, 4 pages.
Office Action for EP Application No. 17736714.1 dated Sep. 7, 2020, 5 pages.

* cited by examiner

APPARATUS AND METHOD FOR GENERATING A MOTIONAL SIGNATURE INDICATIVE OF MOTION OF MOVING PARTS OF A TARGET MACHINE

This application is the U.S. national phase of International Application No. PCT/GB2017/051885 filed 28 Jun. 2017, which designated the U.S. and claims priority to GB Patent Application No. 1611894.5 filed 8 Jul. 2016, the entire contents of each of which are hereby incorporated by reference.

BACKGROUND

The present technique relates to an apparatus and method for generating a motional signature indicative of motion of moving parts of a target machine.

Monitoring the functional integrity of mechanical systems that may consist of many moving components is a challenge because equipping dedicated sensors on all the internal parts is a very expensive as well as a hugely complex task from the design and maintenance perspective. In addition, the internal environment of a machine may not be hospitable to delicate electronics because of extreme conditions due to factors such as heat, vibration, pressure, fluid, and/or electrostatic as well as electromagnetic fields. As a consequence, industrial grade sensors are generally bulky, costly and power hungry.

Machine health monitoring is becoming more vital in modern systems, where ensuring the long-term reliability of machines and avoidance of unexpected breakdowns and costly repair are paramount. Currently in industry, system level machine monitoring is predominantly achieved through vibration analysis with the underpinning assumption being that a mechanical machine has a characteristic vibration signature in a particular running state. Any drift in this signature indicates some malfunctioning in the machine. Vibrations of a machine are typically acquired using accelerometers, which need to be mounted on the body of the machine in order to effectively pick up the vibration. Other popular sensors for machine monitoring are mostly tailored for component level sensing, using devices with laser, inductive, infrared, magnetic or optical effects, which are purposefully designed for a particular function or a component. For example, tachometers are used to determine the position and speed of a revolving part. As another example, a proximity probe is a transducer used for measuring the displacement of a component, for example to map the X-Y plot of a shaft movement in order to detect imperfections such as misalignment of the shaft, faulty bearings, or other external factors preventing perfect rotation.

Although component level monitoring in mechanical systems might be essential for the vital parts which require real time synchronization through computational control, equipping all the components with sensors is not a viable option for monitoring the overall health of the system.

Further, system level monitoring based on vibration analysis only provides a coarse indication regarding the functional integrity of the system because a system level vibration signature is not necessarily the sum of vibrations produced by all the parts, but is more likely to be a result of mechanical interactions of all the parts of the system, which is heavily influenced by other factors such as lubrication. Hence, the vibration characteristics of a machine are likely not to reflect the motional dynamics of its parts.

It would hence be desirable to develop an alternative non-invasive technique for monitoring the health of a machine.

SUMMARY

In accordance with a first aspect, the present technique provides an apparatus comprising: receiver circuitry to receive a signal formed from a plurality of multipath signal components, including a first set of multipath signal components that have been subjected to modulation by interaction with at least one moving part of a target machine, the first set of multipath signal components having time varying signal paths due to the interaction with said at least one moving part; evaluation circuitry to generate, for at least one property of the received signal, an evaluation signal; modification circuitry to produce a modified evaluation signal by applying a removal operation to at least partially remove from said evaluation signal a contribution to that evaluation signal from the multipath signal components whose associated signal paths are non-time-varying; and processing circuitry to perform one or more processing operations on the modified evaluation signal to produce a motional signature indicative of the motion of said at least one moving part.

In accordance with the above technique, a signal is transmitted within a space including a target machine, and then receiver circuitry is arranged to receive that signal. The received signal will be formed from a plurality of multipath signal components, and at least some of those multipath signal components will have taken a path that interacted with the target machine. The inventors realised that the movement of moving parts of the target machine would imprint their footprint on the signal provided that the relevant moving part or moving parts are sensitive enough to the frequency of the signal. Hence, the inventors realised that for a first set of multipath signal components whose paths have interacted with at least one moving part of the target machine, those multipath signal components will have been subjected to modulation by virtue of that interaction, herein such modulation being referred to as mechanical modulation. Provided the material of the moving part is sensitive enough to the signal frequency, the interaction of the moving part with the signal may change certain signal properties such as amplitude, frequency and/or phase.

In accordance with the above described technique, evaluation circuitry is used to generate, for at least one property of the received signal, an evaluation signal. Due to the above described mechanical modulation, the motional signature of one or more moving parts of the target machine will be encoded within the evaluation signal.

However, the inventors also realised that the received signal will include many multipath signal components that have not been subjected to modulation by interaction with moving parts of the target machine, and hence there is the potential for the contribution from those multipath signal components to mask the earlier-mentioned mechanical modulation. However, the inventors realised that it was possible to distinguish between the various multipath signal components by virtue of the nature of those multipath signal components. In particular, the inventors realised that the first set of the multipath signal components that have been subjected to modulation by their interaction with at least one moving part of the target machine will have time varying signal paths due to that interaction. In contrast, the multipath signal components that have not interacted with the target machine will not tend to have such time varying signal paths.

The apparatus of the present technique includes modification circuitry to produce a modified evaluation signal by applying a removal operation to at least partially remove from the evaluation signal a contribution to that evaluation signal from the multipath signal components whose associated signal paths are non-time-varying (at least during the time frame that the motional signature is being determined). As a result, this serves to concentrate the contribution to the evaluation signal towards the multipath signal components in the first set. Hence, this provides an effective mechanism for enhancing the contribution of the multipath signal components that have been subjected to mechanical modulation. Processing circuitry is then provided to perform one or more processing operations on the modified evaluation signal in order to produce a motional signature indicative of motion of the at least one moving part. In particular, for the reasons discussed earlier, the mechanical modulation performed by the moving parts will have caused variations in one or more properties of the received signal that can then be readily observed in the modified evaluation signal by suitable processing techniques, hence enabling an accurate motional signature to be produced indicative of the motion of one or more of the moving parts.

In one embodiment, the motional signature may be indicative of all of the moving parts of the target machine. However, as mentioned earlier, the extent to which mechanical modulation occurs will depend not only on the actual physical movement of the moving part, but also the sensitivity of the material of that moving part to the relevant signal frequency. By suitable tailoring of the frequency of the signal, it may hence be possible to target one or more particular moving parts within the machine for which the motional signature is desired.

There are a variety of forms of signal that propagate in free space that may be used as the received signal. In the described embodiments herein, the signal takes the form of an electromagnetic signal, and more particularly may take the form of a radio frequency (RF) signal. It has been found that the range of frequencies available within the RF band provide suitable frequencies for use with many moving parts of current day machines, and in particular those moving parts have sufficient sensitivity to such RF signals to produce the earlier-mentioned mechanical modulation effect in a measurable way. However, in other embodiments different signals, for example acoustic signals, could be used, which might for example interact better with moving parts made of plastic materials.

The evaluation circuitry can be arranged to generate the evaluation signal in a variety of ways. For example, in one embodiment it may be possible to generate the evaluation signal by directly digitizing the received signal at a very high sampling rate. However, often it may not be possible to achieve such sampling rates. Hence, in accordance with another embodiment the evaluation circuitry is arranged to generate the evaluation signal to be indicative of variation between values of said at least one property of the received signal and corresponding values of said at least one property of a further signal.

The modification circuitry can take a variety of forms, but in one embodiment comprises AC coupling circuitry. In particular, such AC coupling circuitry will serve to remove the static components in the evaluation signal. As mentioned earlier, the multipath signal components that have not interacted with the target machine will be the main source of such static components, and accordingly by removing those components this serves to emphasise the contribution made by the time-varying signal paths that will predominantly be associated with multipath signal components that have interacted with the moving parts of the target machine. This hence provides a simple and effective mechanism for producing the modified evaluation signal from which the motional signature can then be determined.

The AC coupling circuitry can take a variety of forms, but in one embodiment comprises capacitor circuitry located in series between an input and an output of the modification circuitry. Such capacitor circuitry can readily be provided, and may for example be an inbuilt feature of the component used to implement the modification circuitry functionality. For example, an oscilloscope can be used for this purpose, where the existing capacitors within the oscilloscope can be used to provide the AC coupling circuitry functionality. In one embodiment the component used to implement the modification circuitry functionality may also be an inbuilt-part of the front-end circuitry of Analog-to-Digital Convertor (ADC) depending on the manufacturer.

In one such embodiment, such AC coupling will typically be performed on the received analogue signal prior to digitizing that signal for further processing by the processing circuitry. However, in an alternative embodiment the modification circuitry may be arranged to apply a DC filtering operation on the evaluation signal after digitization of that evaluation signal. In particular, following analogue to digital conversion, a DC filtering operation can be performed as an initial processing operation in order to implement the modification circuitry functionality. In such an embodiment, the modification circuitry may for instance comprise a general purpose processor executing suitable software to implement the DC filtering operation on the digitized evaluation signal.

The first set of multipath signal components can take a variety of forms, but in one embodiment have cyclical time varying signal paths due to the interaction with said at least one moving part, which causes said first set of multipath signal components to contribute a cyclical variation to the values of said at least one property of the received signal. In particular, it is often the case that the moving parts of the target machine will move in a cyclical manner, and this will cause the first set of multipath signal components to also have signal paths that vary in a cyclical manner, which in turn will cause variations in the at least one property of each of those multipath signal components. This readily enables the modification circuitry to extract the contribution to the evaluation signal made by such multipath signal components, by removing the contribution to the evaluation signal by any multipath signal components that do not have such a cyclical time varying property.

The further signal that is used by the evaluation circuitry can take a variety of forms. In one embodiment, the receiver circuitry comprises a first receiver to receive said signal and a second receiver separated from the first receiver to receive said further signal, said further signal also formed from a plurality of multipath signal components, including multipath signal components that have been subjected to modulation by interaction with said at least one moving part. Hence, in such an embodiment, the further signal is another version of the transmitted signal. These two versions of the signal received by the first and second receivers can then be compared in order to produce the evaluation signal.

The receivers can take a variety of forms dependent on the type of received signal. In general terms each receiver comprises a sensor for detecting the received signal. In the example where the received signal is an electromagnetic signal such as an RF signal, each receiver may take the form of an antenna.

In one embodiment, the first receiver and the second receiver are separated by a distance sufficient to ensure a difference between said signal and said further signal.

The choice of the distance will typically depend on the environment in which the apparatus is being used. For example signal properties such as amplitude and phase vary spatially because of two factors, a first factor (referred to herein as factor a) being that the amplitude and phase vary in a predictable way along the propagation direction, whilst a second factor (referred to herein as factor b) being that the signal properties vary arbitrarily as the position in space is varied due to the earlier-mentioned multipath effects. In many environments, such as an indoor environment, the factor b may be dominant, and accordingly the separation and distance between the first receiver and the second receiver can effectively be chosen arbitrarily. However, if the multipath effect is weak, which could occur in certain outdoor deployments for example, then the separation may be chosen to be of the order of or greater than the wavelength of the signal.

In an alternative embodiment, rather than the further signal being another version of the transmitted signal as received by a second receiver, a reference signal generation circuitry is provided to generate a reference signal that is then used as that further signal. Whilst in one embodiment this reference signal may be chosen to have the same frequency as the transmitted signal, this is not a requirement and in other embodiments this signal can have a different frequency. For example if the reference signal is of a different frequency to the transmitted signal, and the evaluation signal indicates a difference of the phases of the received signal and the reference signal, then the resultant evaluation signal will have a frequency component equal to the difference of both comparison frequencies, and this information can then be filtered out during digital processing, still enabling an accurate motional signature to be produced.

The at least one property of the received signal for which an evaluation signal is generated can take a variety of forms. In one embodiment, the at least one property of the received signal comprises amplitude and the evaluation circuitry is arranged to generate said evaluation signal having a signal value indicating a ratio of the amplitudes of the received signal and the further signal.

In addition to, or as an alternative to using amplitude, the at least one property of the received signal may comprise phase and the evaluation circuitry may be arranged to generate said evaluation signal having a signal value indicating a difference of the phases of the received signal and the further signal. In one particular embodiment, the generated evaluation signal has both amplitude and phase components, allowing separate motional signatures to be determined for both of those components.

The evaluation circuitry can take a variety of forms, but in one embodiment comprises phase and/or gain detector circuitry arranged to receive as inputs both the received signal and the further signal. A number of pre-existing detector circuits can be used for this purpose if desired.

The processing circuitry can take a variety of forms, but in one embodiment is arranged to perform one or more filtering operations to generate said motional signature from the modified evaluation signal. Whilst the processing circuitry could be formed of dedicated hardware circuit blocks, in an alternative embodiment the processing circuitry may take the form of a general purpose processor executing suitable software routines to perform the necessary processing and filtering operations in order to produce the motional signature from the modified evaluation signal.

The motional signature can be generated in a variety of ways, but in one embodiment the processing circuitry is arranged to generate said motional signature in at least one of a frequency domain and a time domain. When seeking to generate a motional signature in the frequency domain, suitable transformation operations can be performed such as a Fast Fourier Transform (FFT) process.

In another aspect, the present technique provides a method of generating a motional signature indicative of motion of at least one moving part of a target machine, comprising: transmitting within an environment containing said target machine a signal; receiving a signal that is a version of the transmitted signal formed from a plurality of multipath signal components, including a first set of multipath signal components that have been subjected to modulation by interaction with said at least one moving part, the first set of multipath signal components having time varying signal paths due to the interaction with said at least one moving part; generating, for at least one property of the received signal, an evaluation signal; producing a modified evaluation signal by applying a removal operation to at least partially remove from said evaluation signal a contribution to that evaluation signal from the multipath signal components whose associated signal paths are non-time-varying; and performing one or more processing operations on the modified evaluation signal to produce said motional signature.

As mentioned earlier, the environment may be an indoor environment or an outdoor environment. However, the use of an indoor environment has the benefit that it tends to enhance the number of multipath components, which as mentioned earlier can be used beneficially to improve the observability of the mechanical modulation effect.

Various measures can be taken to further improve the sensitivity of the technique to the mechanical modulation imparted on the signal via movement of the moving parts of the machine. In one embodiment, the receiving, generating, producing and performing steps are performed within detector circuitry, and the detector circuitry is placed closer to the target machine than a transmitter used to transmit said signal. By placing the detector circuitry closer to the target machine than a transmitter used to transmit the signal, this serves to increase the proportion of multipath signal components within the first set. In particular, after applying mechanical modulation to the signal (also referred to herein as "crunching" the signal) the machine becomes the omni-directional source of the mechanically modulated signal and hence the strength of the mechanically modulated signal will fall with the square of the distance from the machine. Thus, by placing the detector close to the machine, this increases the strength of the mechanical modulated signal.

In one embodiment, as another measure to increase the sensitivity, the transmitter is located relative to the detector circuitry so as to reduce a contribution to the received signal from multipath signal components that are not in the first set. When keeping the relative distance between the transmitter and the machine the same, this can be achieved by placing the transmitter as far as possible from the detector circuit in order to thereby decrease the static component of the received signal, and hence increase the sensitivity to the time varying components that predominantly come from the multipath signal components that have interacted with the moving parts of the target machine.

In one embodiment, the transmitted signal has a carrier frequency selected having regard to at least one property of said at least one moving part. This property can take a variety of forms. For example, it may comprise the material of the moving part, since as mentioned earlier certain types of material will be more sensitive to particular frequencies than others. In addition, or alternatively, the property of the at least one moving part that is taken into account is the size of the moving part.

Whilst in some embodiments suitable motional signatures indicative of the motion of the moving parts of the machine can be generated using a single frequency for the transmitted signal, in an alternative embodiment a multi-stage process can be implemented using different frequencies of signals. In particular, in one embodiment the transmitting step may comprise transmitting a series of signals having different carrier frequencies. The receiving, generating, producing and performing steps are then performed for each of a series of received signals corresponding to the series of transmitted signals, in order to produce the motional signature for each of the different carrier frequencies.

This process can be repeated on an ongoing basis if desired for continuous monitoring of the machine. The iteration repetition frequency can be varied dependent on a number of factors, for example the monitoring resolution required in terms of alert-time. It may also depend on other factors such as the speed at which the machine transitions through certain state transitions, where different parts may then operate at different speeds.

Further, the transmit interval for each carrier frequency can be varied as desired. In one embodiment the time for which the transmitter transmits at each carrier frequency takes account of the Nyquest criteria for digitization, in order to ensure that the detector has sufficient time to capture the motional signature unambiguously considering the fact that the sampling frequency should be at least twice the highest mechanical frequency of the part(s) of the machine whose motion is being captured.

In one such embodiment, the receiving, generating, producing and performing steps are performed within detector circuitry, and the transmitting step is arranged to switch between the signals in said series under control of the detector circuitry. Hence, in such an embodiment, the operation of the transmitter, and in particular the decision as to when to switch between different carrier frequencies for the transmitted signal, is managed under the control of the detector circuitry. This can for example enable the detector circuitry to ensure that it obtains a suitably detailed motional signature for each of the transmitted carrier frequencies.

In a yet further aspect the present technique provides an apparatus comprising: receiver means for receiving a signal formed from a plurality of multipath signal components, including a first set of multipath signal components that have been subjected to modulation by interaction with at least one moving part of a target machine, the first set of multipath signal components having time varying signal paths due to the interaction with said at least one moving part; evaluation means for generating, for at least one property of the received signal, an evaluation signal; modification means for producing a modified evaluation signal by applying a removal operation to at least partially remove from said evaluation signal a contribution to that evaluation signal from the multipath signal components whose associated signal paths are non-time-varying; and processing means for performing one or more processing operations on the modified evaluation signal to produce a motional signature indicative of the motion of said at least one moving part.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

As will be described with reference to the following description of embodiments, a technique has been developed for deriving a motional signature corresponding to the physical movement of moving parts of a machine using a detector device to analyse a received signal that has been propagated within an environment including the machine. For the purposes of the described embodiments it will be assumed that the received signal is an electromagnetic signal, but in alternative embodiments other forms of signal that propagate through free space may be used, for example acoustic signals. In one embodiment, the electromagnetic signal is a radio frequency (RF) signal, since it has been found that RF signals are well-suited having regard to the materials used for many moving parts in modern day machines. The underpinning insight exploited by the technique is that any physical movement imprints its footprint on an RF signal provided the material of the moving part is sensitive enough to the subjected signal frequency. In one embodiment an ISM band RF signal is transmitted that is strong enough to reach out to the remote machine to be monitored. As will be discussed in more detail later, the moving parts of the machine modulate their motion signatures on the RF signal present in that space (a process that will be referred to herein as "RF crunching"), and the micro variations in the signal scattered by the running machine after being RF crunched by its moving components are then observed.

Figure 1:
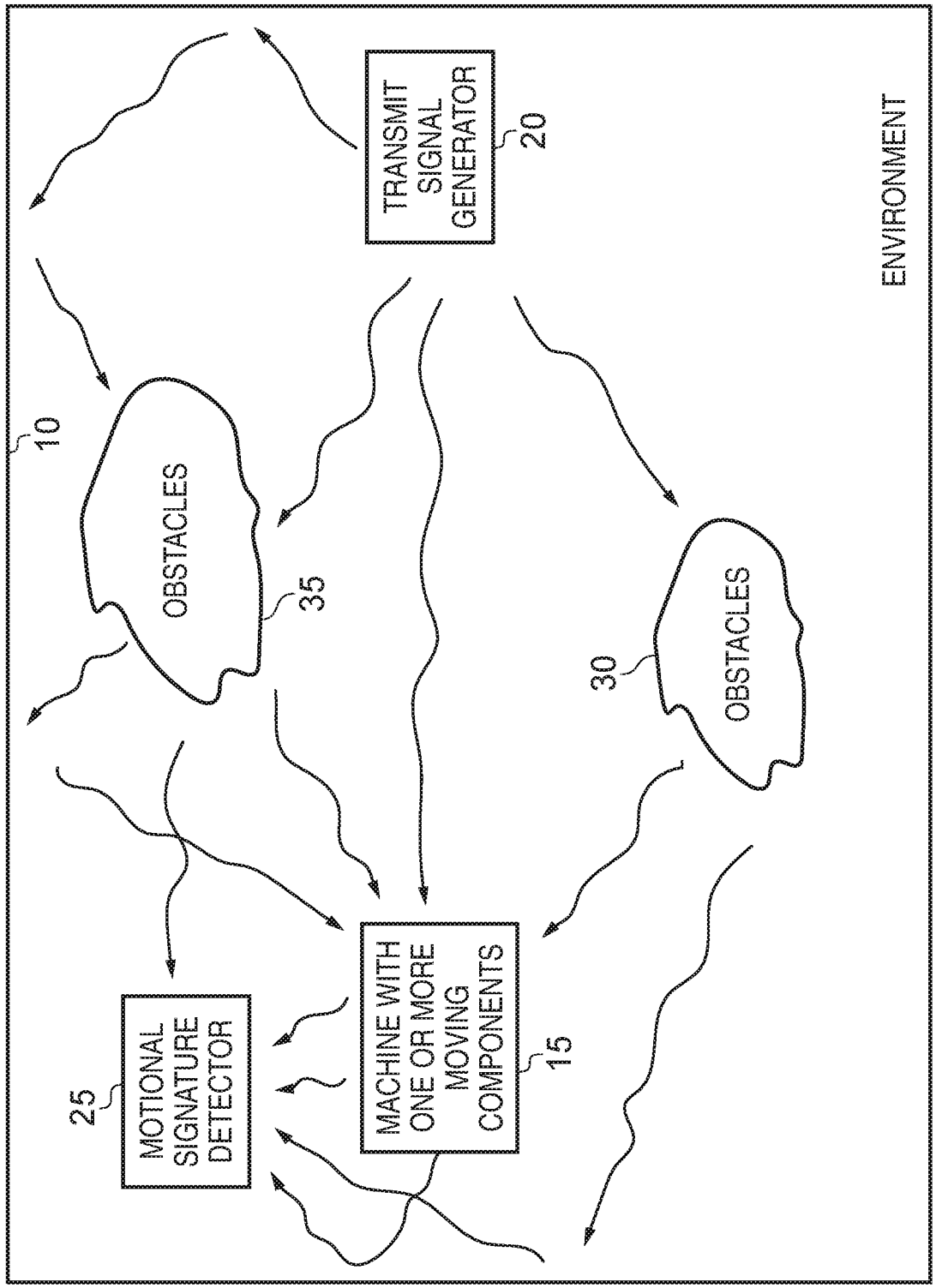
FIG. 1 is a block diagram providing an overview of the technique used in accordance with the described embodiments.

FIG. 1 schematically illustrates the technique used in the described embodiments. A machine 15 with one or more moving components is placed within an environment 10, and within that environment a transmit signal generator 20 is used to transmit an RF signal. A motional signature detector 25 is also located within the environment 10, and is arranged to receive an RF signal that is a version of the transmitted RF signal formed from a plurality of multipath signal components as illustrated schematically by the various paths illustrated in FIG. 1. Those multipath signal components will take a variety of different paths through the environment, being scattered by various obstacles 30, 35 present within the environment. In addition, a certain subset of those multipath signal components will have taken a path that has involved interaction with the machine 15, and in particular with the moving parts of that machine. Those multipath signal components will have been RF crunched due to their interaction with the moving part of the machine, and the motional signature detector 25 is arranged so as to enable analysis of those particular multipath signal components so as to extract the resultant motional signature.

It will be appreciated that most real world application environments are full of obstacles, which makes the propagation paths of radio signal very complex. In an indoor or urban environment, RF signals experience reflection, refraction and scattering while interacting with the obstacles, there the signal reaches the detector 25 via many complicated paths. In such a multipath environment, a small change in the medium may alter the radio propagation paths dramatically. As a result, the signal can vary widely in amplitude and phase spatially across the coverage area because multipath signals can add-up in different phases at various locations due to different arrival times through various paths. The variations in the amplitude and phase of the signal as one moves one's observation point spatially in the coverage area might be completely arbitrary, i.e. there might not exist any spatial correlation in the signal properties, similar to the free space propagation.

If the whole environment under the coverage area of the radio signal remains static, the amplitude and phase of the signal observed at any point under the coverage area should remain static as well. But any miniscule motion in the environment is likely to alter signal paths significantly, and consequently, amplitude and phase of the signal at any observation point across the coverage area might change arbitrarily. If this is a cyclical motion, signal paths will change in a cyclical fashion as well, and as a result signal properties (amplitude and phase) at any observation point will change in a cyclical fashion as well. The components of machines mostly perform repetitive motions, so they will change signal properties in a cyclical manner as well. In broader terms, an object in motion imprints the signature of its motion on to the RF signal present in that space, and this happens prominently because of the multipath effect, and hence herein this phenomena will be referred to as "Multipath Modulation".

Considering now in more detail the RF crunching operation mentioned earlier, the raw RF signal with carrier frequency $f_c$ and phase $\phi$ transmitted from the transmitter 20 could be expressed as follows:

$$Tx(\text{raw}) = A \sin(2\pi f_c t + \phi)$$

In one embodiment only a raw RF signal is propagated with no data being embedded therein. However, in other embodiments the process can make use of pre-exiting RF signals in the environment which will typically have data packets embedded therein. If the transmitted signal contains data packets, its amplitude, frequency and phase can be functions of time depending on the modulation type used. So, more broadly, an RF signal containing data can be expressed by following.

$$Tx(\text{data}) = A_t \sin(2\pi f_t t + \phi_t)$$

The interaction of a moving physical object like a machine component with an RF signal present in that space can be understood as a modulation process which embeds data into the carrier RF signal. However, whereas modulation is normally performed as an electronic process, the modulation in this instance occurs via a mechanical process, and hence will be referred to herein as "mechanical modulation".

Mechanical modulation of a machine's motional signature on the RF signal depends on the material of the object as well as the physical movement. It may change the signal properties imprinting its motional information on the amplitude, frequency and the phase of the signal, provided the material is sensitive enough to the signal frequency. In industrial environment, mostly machine components are made of metals, which strongly interact with an RF signal in the ISM band. However, for components made of plastic it may be appropriate to use a higher frequency signal in order to ensure sufficient interaction. Further, as will be discussed later with reference to FIGS. 9 and 10, a multi-spectral approach can be taken if desired, where the signature detection process is repeated for a variety of different frequencies of electromagnetic signal, in order to build up motion signatures for a variety of different components which may be made of different materials and be of different sizes. Such a multi-spectral approach may also be useful in situations where the moving parts of the machine are enclosed in a metal cage, and hence not all frequencies will be able to penetrate inside the machine with the same strength.

The mechanically modulated signal picked up by the detector (also referred to herein as the CogniSense detector) can be expressed as follows:

$$\text{CogniSense}(Rx) = Tx \otimes \text{Sig}(M)$$

Figure 2:
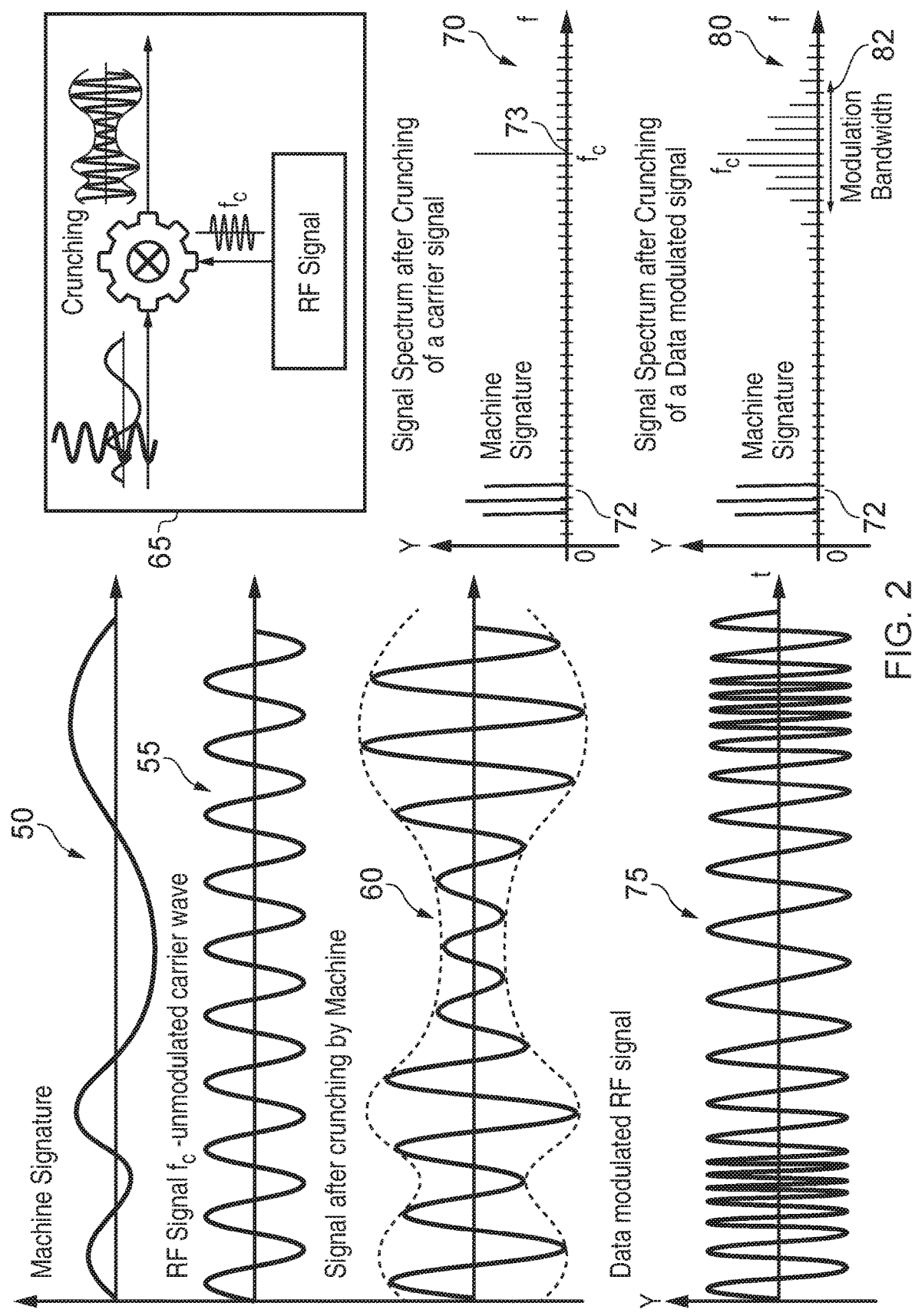
FIG. 2 schematically illustrates how the movement of moving parts of a machine may mechanically modulate a radio signal in accordance with the described embodiments.

FIG. 2 illustrates the above discussed mechanical modulation process. The waveform 50 is illustrative of the modulating signal due to mechanical movement of parts of the machine, whereas the waveform 55 represents the unmodulated carrier wave transmitted from the transmitter 20. The mechanical modulation, or RF crunching, technique is illustrated schematically by the box 65, which shows the unmodulated carrier wave 55 being subjected to RF crunching by the machine signature 50 resulting in the modulated RF signal 60. Within the frequency spectrum, the signature is as shown by the graph 70, where the machine signature 72 is represented by spikes at a number of different frequencies which are well separated from the carrier frequency 73 within the frequency spectrum.

As mentioned earlier, the transmitted RF signal from the transmit signal generator 20 need not be a raw unmodulated carrier wave, but instead the system may make use of an existing transmitted RF signal, which may include some modulated data, as illustrated by way of example with reference to the data modulated RF signal 75 in FIG. 2. As will be discussed in more detail below, this does not cause a problem, since as illustrated by the frequency spectrum 80, the modulation bandwidth 82 associated with the originally modulated data is usually well separated in the frequency spectrum from the machine signature 72.

One consideration when analysing the signal picked up by CogniSense is how human movements in the vicinity of the machine might impact its signature, and how any data packets that may be contained in the RF signal get impacted by the machine modulation.

Mostly humanly disturbances fall in a very low frequency region compared to usual frequency of operation of mechanical systems. For example, human walking, running, breathing and even heartbeat fall under 5 Hz, while most mechanical machines run typically between 500-90,000 RPM (Revolutions Per Minute) or 8-1500 Hz, as shown in Table 1 below:

TABLE 1

Running Frequencies of various Machines

| Machine | RPM | Hz |
|---|---|---|
| Washing Machine | 500-2000 | 8-33 |
| power generation turbine | 3000 OR 3600 | 50 OR 60 |
| Automobile Engines | Cruising: 2000-3000 | 33-50 |
|  | Idle: 750-900 | 12.5-15 |
|  | Max: 4500-10,000 | 75-166 |
| Formula 1 Car | Max: 15000 | 250 |
| 8-Cylinder F1 Car | Max: 18000 | 300 |
| Aircraft Engine | 2000-3000 | 30-50 |
| Computer Hard Drive | 5400 OR 7200 | 90 OR 120 |
| Uranium Centrifuge | 90,000 | 1500 |

On the other hand, data rate of wireless devices (generally between 1 kpbs-1 GHz) is comparatively very high relative to the frequencies of the mechanical systems. Consequently, the spectral signature of the data in the RF signal falls in a relatively very high frequency region, as shown earlier with reference to FIG. 2. Mostly data modulation spreads signal energy around the carrier frequency, which are known as side lobes. Due to spectrum regulations, after modulation signal should not fall outside the designated band; for example in 2.4 GHz (802.11 b/g/n compliant) band after modulating data on the RF signal, signal must fall in the 80 MHz window between 2.412-2.482 GHz. Hence, the mechanical modulation signature will typically lay outside the frequencies holding any modulated data in the originally transmitted RF signal, and hence the modulated data in the originally transmitted RF signal will not interfere with the motional signature information from the machine.

The general methodology employed by the CogniSense detector 25 in the described embodiments will now be discussed in more detail. As the motional footprint embedded in the RF signal via the mechanical modulation process could be too miniscule to be observed directly, acquiring the machine signature embedded in the signal through 'RF crunching' is not a straight forward task using commodity hardware. For example, a standard radio device usually passes the signal through a bandpass filter in the receive chain of the analog frontend of a transceiver after picking the signal from the antenna. The bandwidth of this bandpass filter is usually equal to the spectral width of the channel, and consequently all other information in the signal embedded by the unknown sources is effectively filtered out because this is considered as irrelevant noise in communication systems. Hence the motional signature information would hence be lost. Apart from that, commodity radio devices do not typically provide adequate access to their physical layer, which makes it difficult to snip out the motional signature before the filtering path.

Figure 3:
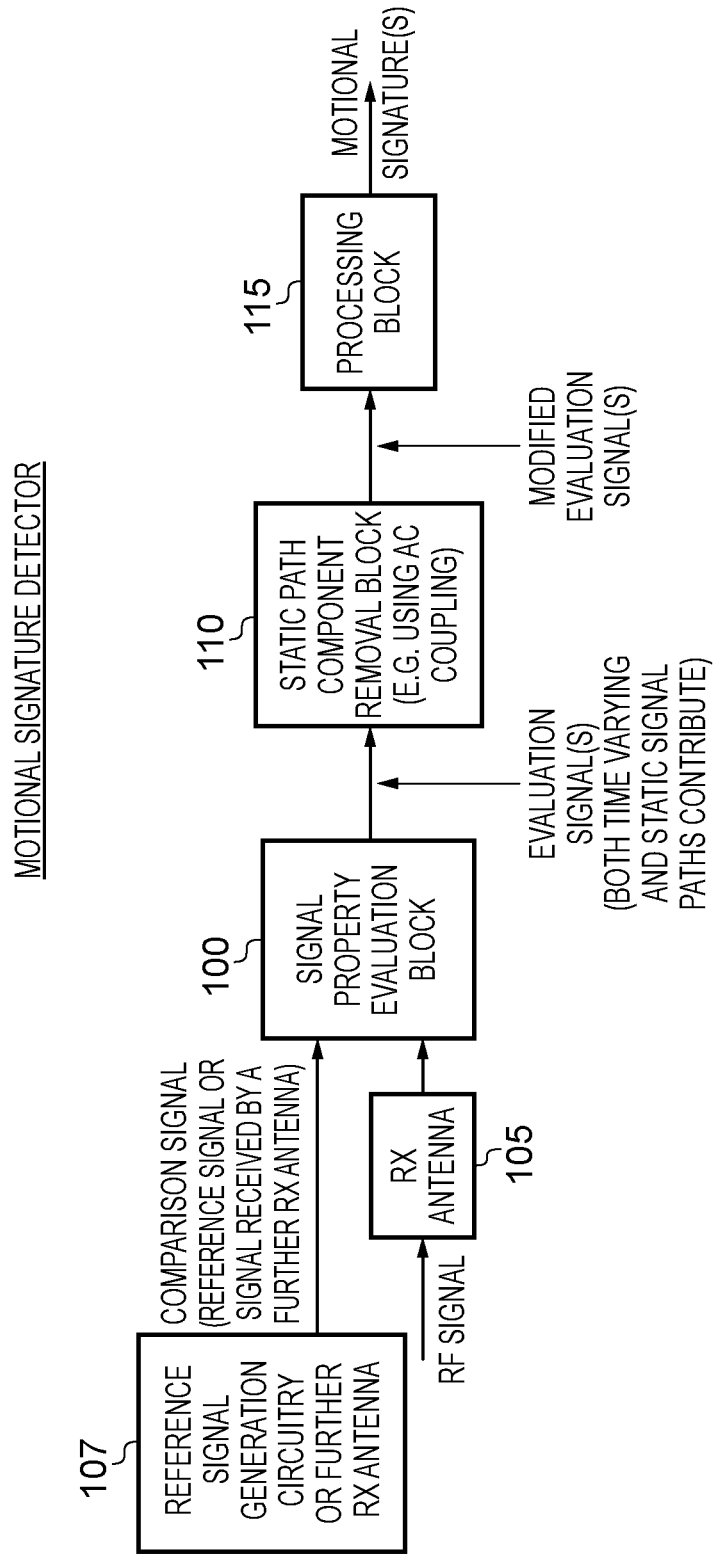
FIG. 3 is a block diagram illustrating the operation of a motional signature detector in accordance with one embodiment.

As will now be discussed with reference to FIG. 3, a motional signature detector has been developed which exploits the phenomena of multipath propagation to beneficial effect. A receive antenna 105 is provided for receiving an RF signal that has been transmitted within the environment 10, this RF signal being formed from a plurality of multipath signal components. Those multipath signal components will include a first set of multipath signal components that have been subjected to mechanical modulation by interaction with moving parts of the machine 15. The received signal from the antenna 105 is passed to a signal property evaluation block 100, which also receives a further comparison signal. In one embodiment, this comparison signal is another version of the received RF signal that is received by a further antenna that is physically separated from the antenna 105. Such a signal will also include a plurality of multipath signal components, and at least some of those multipath signal components will have been subjected to mechanical modulation by interaction with the moving parts of the machine 15.

The separation between the two receive antennae should be enough to provide a measurable difference in the signal properties that are to be evaluated by the evaluation block 100, in one embodiment the evaluation block evaluating one or both of amplitude and phase of the received signals. Signal properties such as amplitude and phase vary spatially because of two factors. Firstly, amplitude and phase will vary in a predictable way along the propagation direction. However, in addition, due to the multipath effect, the signal properties may vary arbitrarily as one moves spatially within the environment 10. If this multipath effect is dominant, as will typically be the case in a complex indoor/urban environment, the separation between the two receive antennae can effectively be chosen arbitrarily, since the multipath effect will ensure that there are differences in the signal properties that can be measured. If instead the environment is relatively obstacle free, the detector will still operate correctly due to interaction of the RF signal with the moving parts creating a multipath effect. However, if the multipath effect is weak, then the desired separation between the two receive antennae should be dictated by the first factor mentioned earlier, and hence in one embodiment may be chosen to be of the order of a wavelength of the transmitted RF signal.

In an alternative embodiment there is no need for the comparison signal to be another version of the received signal, and instead a locally generated reference signal, generated by reference signal generation circuitry, can be used to compare with the signal received by the antenna 105. This reference signal may or may not have the same frequency as the transmitted signal from the transmitter 20. In particular, it need not be of the same frequency since a resultant phase signal derived by the evaluation block 100 will have a frequency component equal to the difference between the frequencies of the two compared signals, which can readily be filtered out during later digital processing. In summary, as shown in FIG. 3, the comparison signal may originate from an element 107, which may be reference signal generation circuitry, or as discussed earlier, may be a further receive antenna.

The signal property evaluation block 100 evaluates at least one property of the received signals. In one embodiment, the evaluation block 100 is used to estimate the amplitude ratio of the two received signals and the phase difference of those two received signals. The resultant evaluation signal is a phasor having a first signal value indicating a ratio of the amplitudes of the two received signals (denoted herein as G(t)) and a second signal value indicating the difference of the phases of the two received signals (denoted herein as P(t)). The evaluation signal made up of the above P and G components is forwarded to static path component removal block 110.

If the whole environment 10 under the coverage area of the radio signal remains static, amplitude and phase of the signal observed at any point under the coverage area should remain static as well, provided any inherent noise could be ignored. As a result, both the P and G outputs of the evaluation block 100 should remain constant in an unchanging environment. But any miniscule disturbance in the environment is reflected as a change in the outputs of the evaluation block, because it is highly unlikely that the altered signal paths in a multipath environment will result in the same values of amplitude and phase of the signal at an observation point. Further, it is even more unlikely that it can remain unchanged at two observation points under consideration.

Further, as discussed earlier, the multipath signal components that have interacted with the moving parts of the machine will undertake signal paths that will change in a time varying, typically cyclical, fashion due to the movement of the machine parts. This will cause the signal properties at any observation point to change in a time varying, typically cyclical, manner as well. Hence, this phenomena can be used to enhance the contribution to the evaluation signal from the multipath signal components that have interacted with the machine. In particular, the signal components reaching the detector directly or indirectly via any paths other than those that have passed through the machine will essentially remain static considering the time frame of the observation for capturing the machine signature, and the static components can be removed by appropriate processing of the received evaluation signal. For example in one embodiment AC coupling is used by the block 110 to effectively remove those static components, and hence produce a modified evaluation signal where variations in the amplitude and phase properties are then due to the time varying signal path components, which as mentioned earlier will essentially be the signal path components that have involved interaction with the machine, and hence which have been subjected to mechanical modulation.

The modified evaluation signal can then be passed to processing block 115, which performs a number of processing operations on the evaluation signal in order to produce the motional signature(s). These processing stages will typically be performed in the digital domain, and hence on the front end of the processing block 115 an analogue to digital conversion will take place in order to convert the modified evaluation signal into a digitized form which is then processed.

Whilst in one embodiment, the static path component removal block 110 is implemented in the analogue domain prior to digitizing of the signal, it could alternatively be performed in the digital domain, as an initial DC filtering stage implemented by the processing block 115 after digitization of the signal.

The processing performed by the processing block 115 will depend on the type of motional signature being produced. If the motional signature is expressed in the time domain, it may be sufficient to use a sliding window low pass filter to extract the motional signature. However, often it is useful to express the motional signature in the frequency domain, as it is generally easier to identify the contributions from the individual moving parts by analysing the signature in the frequency domain. In that event, a number of processing and filtering stages may be employed, including for example a Fast Fourier Transform (FFT) process to convert the information into the frequency domain.

Figure 4:
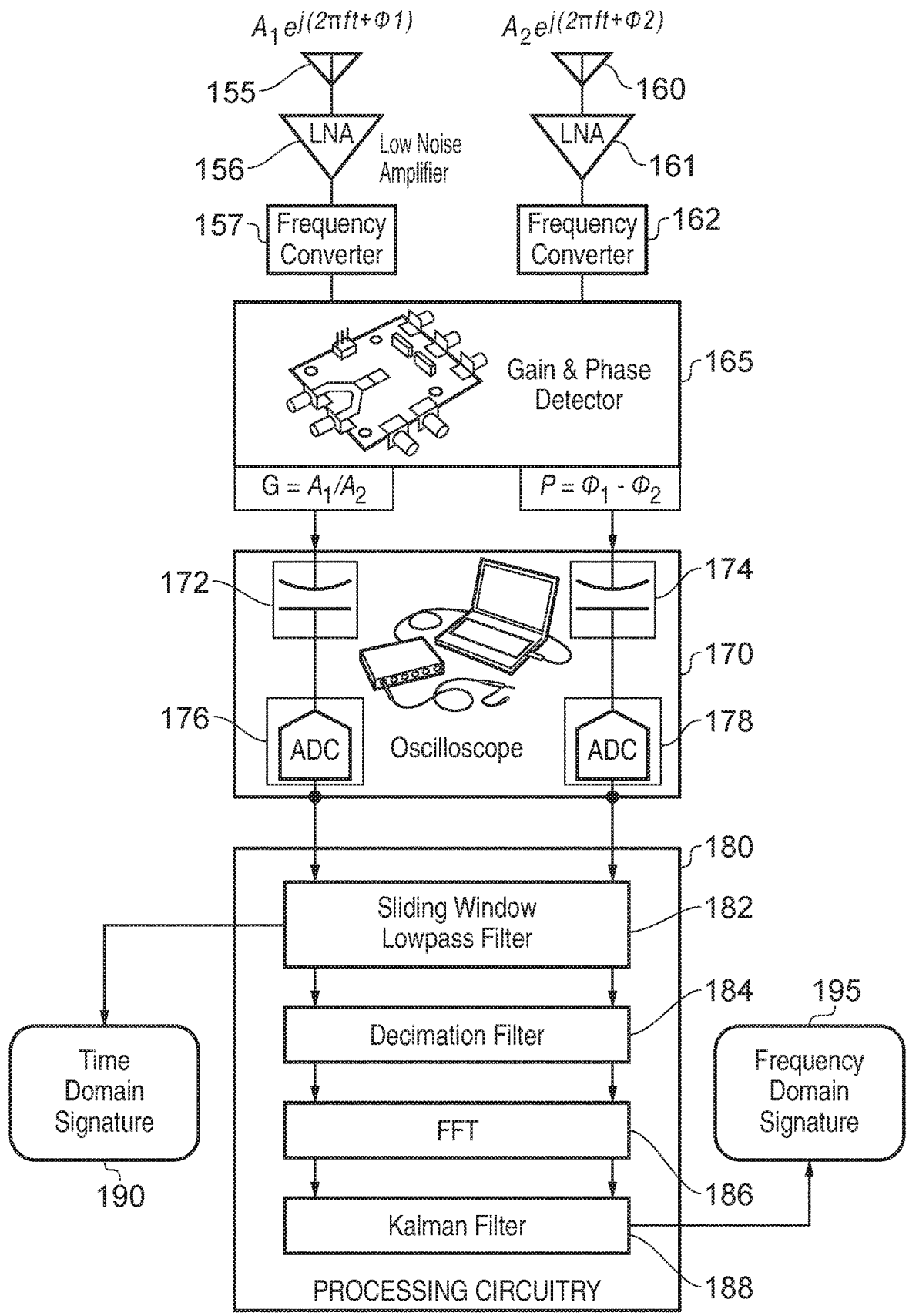
FIG. 4 is a diagram illustrating in more detail a motional signature detector in accordance with one embodiment.

FIG. 4 is a block diagram illustrating in more detail the motional signature detector in accordance with one embodiment. In this embodiment, two receive antennae 155, 160 that are physically separated from each other are used to receive two versions of the transmitted RF signal, as mentioned earlier these receive signals being formed from a plurality of multipath signal components including some signal components that have been subjected to mechanical modulation by the machine 15. The signal property evaluation block 100 takes the form of the phase and gain detector 165 which computes the earlier mentioned evaluation signals G and P which are representative of the resulting phasor.

The components 156, 157, 161 and 162 are optional components that may be used in some embodiments. In particular, the phase/gain detector 165 will often have a limited input bandwidth, and hence if the carrier frequency of the received signals is outside the spectral range of that detector, frequency conversion blocks 157, 162 may be provided in both of the input signal paths, which can appropriately convert the carrier frequency down to the frequency window of the detector prior to the signals being received by the detector 165.

In addition, if the transmitter is relatively far away from the detector, the RF signal present in the environment may need amplification in order to be above the sensitivity threshold of the detector 165. In that event, amplifier blocks 156, 161 can be provided just after the associated antennae 155, 160, which could for example be implemented by a Low-Noise-Amplifier (LNA), which is a default part of the analog front-end in typical communication receivers. Using this approach, the distance at which the transmitter and the CogniSense receiver could be placed relative to the machine can be greatly increased (for example up to several kilometers), which could be highly useful in hostile environments.

Irrespective of any optional amplification and frequency conversion that is performed, the earlier-mentioned evaluation signals G and P produced by the detector 165 are then passed through an oscilloscope 170 which includes capacitor blocks 172, 174 which act as AC coupling circuitry to implement the static path removal functionality of the static path component removal block 110. These signals are then passed through analogue to digital (ADC) converter blocks 176, 178 (which in the described implementation are also part of the oscilloscope) in order to create a digitized version of the resultant modified evaluation signal, which is then passed to the processing circuitry 180. In one embodiment, the ADC components 176, 178 digitize the signal with 1500 samples per second at 15-bit resolution. As per Nyquest's theorem, this sample rate is adequate to capture the signature of a machine running at up to 45000 rpm, which is far higher than the running frequencies of most of the mechanical systems as listed in the earlier mentioned Table 1.

The processing circuitry 180 in one embodiment has an API used to acquire the real-time data being fed from the oscilloscope 170, and after acquisition the signal passes through a sliding-window low-pass filter 182 in order to remove the high-frequency noise resulting in the smoothening of the signal. A time domain signature 190 can then be produced directly from the filter 182.

If desired, the output from the filter 182 can then be passed through a decimation filter 184. For instance, in an example scenario the target machine may be a table fan with a maximum speed under 1200 rpm, while the sample rate as mentioned earlier is over 10-fold higher. Hence, by passing the signal through a decimation filter with a down-sampling factor of 10, the consequent output spectrum then spans up to 4500 rpm, which is more than sufficient for the purposes of the target machine.

The resultant signal is then passed through an FFT processing stage 186 which is then followed by a Kalman filter operation 188 in order to smooth the resultant spectrum in the frequency domain. The resultant P and G signatures 195 in the frequency domain can then be output.

Whilst the functionality of the processing circuitry 180 could be implemented using dedicated hardware circuits, in one embodiment the processing circuitry takes the form of a general purpose processor running suitable software routines to perform the various processing and filtering stages required.

For completeness, the following mathematical analysis is provided to illustrate the techniques employed by the described embodiments. For a mathematical treatment, signals at two observation points can be represented by the following phasor notations:

$$h_1(A_1 \angle \phi_1) = A_1(t) e^{j(2\pi f t + \phi_1(t))}$$

$$h_2(A_2 \angle \phi_2) = A_2(t) e^{j(2\pi f t + \phi_2(t))}$$

where f, A and $\angle \phi$ represents frequency, amplitude and phase of the signal respectively. It is to be noted that the amplitude and the phase are time-varying parameters due to "Multipath Modulation" of any motion in the environment.

In the CogniSense detector of one embodiment, the signals picked up from two observation points are fed to a phase detector, which effectively divides these two signals, and outputs the amplitude and the phase of the resulting signal.

$$\frac{h_1(A_1 \angle \phi_1)}{h_2(A_2 \angle \phi_2)} = \frac{A_1(t) e^{j(2\pi f t + \phi_1(t))}}{A_2(t) e^{j(2\pi f t + \phi_2(t))}} = \left(\frac{A_1(t)}{A_2(t)}\right) (e^{j(\phi_1(t) + \phi_2(t))})$$

The resulting signal is a phasor with an amplitude equal to the ratio of the amplitudes of the input signals (which as mentioned earlier is denoted as G(t)); and with phase equal to the difference of the phases of the input signals (which as mentioned earlier is denoted as P(t)).

$$G(t) = \frac{A_1(t)}{A_2(t)}$$

$$P(t) = \phi_1(t) - \phi_2(t)$$

As the frequency of both the inputs is the same, the resulting signals G(t) and P(t) should remain static if the amplitudes and the phases of the input signals are not time-varying; i.e. both the outputs of the phase detector should remain static if there is no motion.

However, if there is a periodic motion in the coverage area of the radio, it should alter the paths of the signal passing through the mobile object in the same periodic fashion. As a result, the amplitude and the phase of the signal at any observation point in the coverage area should reflect the same periodic variation. Due to an object undergoing cyclical motion with frequency f, the variation in the amplitude and the phase at two observation points under consideration could be expressed as follows:

$$A_1(t) = a_1^A \cos(2\pi f t + \psi_1^A) = \text{Re}\{a_1^A e^{j(2\pi f t + \psi_1^A)}\}$$

$$A_2(t) = a_2^A \cos(2\pi f t + \psi_2^A) = \text{Re}\{a_2^A e^{j(2\pi f t + \psi_2^A)}\}$$

$$\phi_1(t) = a_1^\phi \cos(2\pi f t + \psi_1^\phi) = \text{Re}\{a_1^\phi e^{j(2\pi f t + \psi_1^\phi)}\}$$

$$\phi_2(t) = a_2^\phi \cos(2\pi f t + \psi_2^\phi) = \text{Re}\{a_2^\phi e^{j(2\pi f t + \psi_2^\phi)}\}$$

where, a and ψ with corresponding subscripts and superscripts are amplitudes and phases of the corresponding periodic signals emanating from the motion of the object. Further:

$$P(t) = a_1^\phi \cos(2\pi f t + \psi_1^\phi) - a_2^\phi \cos(2\pi f t + \psi_2^\phi)$$

$$P(t) = \text{Re}\{a_1^\phi e^{j(2\pi f t + \psi_1^\phi)}\} - \text{Re}\{a_2^\phi e^{j(2\pi f t + \psi_2^\phi)}\}$$

$$P(t) = \text{Re}\{(a_1^\phi e^{j\psi_1^\phi} - a_2^\phi e^{j\psi_2^\phi}) e^{j2\pi f t}\}$$

$$G(t) = \frac{a_1^A \cos(2\pi f t + \psi_1^A)}{a_2^A \cos(2\pi f t + \psi_2^A)} = \frac{\text{Re}\{a_1^A e^{j(2\pi f t + \psi_1^A)}\}}{\text{Re}\{a_2^A e^{j(2\pi f t + \psi_2^A)}\}}$$

Here, it is to be noted that the addition or subtraction of two sinusoidal signals produces another sinusoidal signal with the same frequency. However, division of two sinusoidal signals does not produce a sinusoidal signal, but this will result in a periodic signal with same the frequency. As a consequence, signal P(t) is a sinusoidal with same periodicity f, but signal G(t) is not a sinusoidal, but periodic in nature with the same frequency f.

To consider the signature from motional dynamics, let us assume a machine consists of the following n moving components performing cyclical motions.

$$P = \{P_1, P_2, P_3 \ldots P_n\}$$

In a mechanical system, motional path of a component might be a zig-zag complex cycle in 3-D space. Let's assume that trajectory of the cyclical motion for the center of mass of part $P_i$ is given by following.

$$P_i = \{x_t^i, y_t^i, z_t^i\}$$

The frequency domain representation for the motion of $P_i$ can be given by following:

$$\text{Sig}(P_i) = \text{Sig}(x_t^i) + \text{Sig}(y_t^i) + \text{Sig}(z_t^i)$$

Since, the component undergoes cyclical motion, its coordinate with respect to time should generate periodic signals. According to the Fourier theorem, if a signal is periodic with frequency f, only the frequencies composing the signal are integer multiples of f, i.e., f, 2f, 3f, 4f, etc., and these frequencies are called harmonics. The first harmonic is f, the second harmonic is 2f, the third harmonic is 3f, and so forth. The first harmonic is known as the fundamental frequency.

Since all three coordinate signals of component $P_i$ must have the same periodicity, their fundamental frequency must be the same, which will be equal to its periodicity. Let's assume the fundamental frequency of $P_i$ is $f_0^i$; and let's represent a frequency component in terms of its amplitude and phase information by f (A, $\angle \phi$). The spectral signature of the motion of a component $P_i$ can be represented by following; where m is the maximum harmonic present in the signature.

$$Sig(P_i) = \sum_{j=1}^{m} jf_0^i(A_x^i \angle \phi_x^i) + \sum_{j=1}^{m} jf_0^i(A_y^i \angle \phi_y^i) + \sum_{j=1}^{m} jf_0^i(A_z^i \angle \phi_z^i)$$

Spectral components of same frequencies can be added together with their respective amplitude and phase information.

$$Sig(P_i) = \sum_{j=1}^{m} jf_0^i(A_x^i \angle \phi_x^i + A_y^i \angle \phi_y^i + A_z^i \angle \phi_z^i)$$

For a machine consisting of n components, the spectral signature can be described as a sum of the signatures of all the components by the following:

$$Sig(M) = \sum_{i=1}^{n} \sum_{j=1}^{m} jf_0^i(A_x^i \angle \phi_x^i + A_y^i \angle \phi_y^i + A_z^i \angle \phi_z^i)$$

$$Sig(M) = \sum_{i=1}^{n} \sum_{j=1}^{m} \left(A_x^i e^{\phi_x^i} + A_y^i e^{\phi_y^i} + A_z^i e^{\phi_z^i}\right) e^{2\pi j f_0^i t}$$

After the "Multipath Modulation" of the RF signal by the machine, the machine signature Sig (M) will get modulated upon the amplitude as well as upon the phase of the signal, which could be observed at any point in the coverage area. Let's represent output signals of the phase detector in terms of the machine signatures picked up at two observation points Sig(M, 1) and Sig(M, 2) under consideration by CogniSense.

$$G(t) = \frac{Sig(M, 1)}{Sig(M, 2)}$$

$$P(t) = Sig(M, 1) - Sig(M, 2)$$

In a factory environment, there could be multiple machines running in the coverage area of the CogniSense. So, signature picked up by CogniSense could be expressed as an aggregate of N machines.

Complex machines like an automobile engine, turbine, aircraft or a manufacturing setup are an intricate interconnect of thousands or millions of miniature parts. Mechanical components of a machine are mostly performing repetitive motions, and different components of a machine might be performing cyclical motion with different characteristic frequency. For a machine consisting of n components, where component i is undergoing cyclical motion with periodicity $f_m^i$ in a certain running state of the machine, the outputs of the phase detector capturing the machine signature could be expressed as follows:

$$P(t) = \sum_{i=1}^{n} A_0^i e^{j(2\pi f_m^i t + \phi_A^i)}$$

$$G(t) = \sum_{i=1}^{n} \phi_0^i e^{j(2\pi f_m^i t + \psi_\phi^i)}$$

where, $A_0$, $\phi_0$, $\psi_A$ and $\psi_\phi$ are amplitudes and phases of the corresponding periodic signals emanating from the motions of the machine parts.

Here phase components indicate the relativity of the motions of the components. Since various moving components of a machine are interconnected, so relative phases of their cyclical motions are also characteristic of the functional integrity of the machine because, in a mechanical system, synchronization or coordination among its various parts or subsystems may be very critical for the functional accomplishment of the machine.

The amplitudes of P(t) & G(t) indicate the sensitivity of the CogniSense with respect to a movement. This may depend on object material and its dimension, size of the motion, and on the relative placements of the Transmitter, Machine and the CogniSense detector device. How the sensitivity of CogniSense depends on the relative placements of the Transmitter, Machine and the CogniSense device will be discussed later.

At an observation point, the net signal can be described as a phasor sum of all the multipath components reaching via all the paths. For the sensitivity analysis of the CogniSense detector, this could be expressed as a sum of the following two contributions.

1) The signal reaching the CogniSense detector via all the paths through machine M, which changes because the signal paths are altered due to the motion of the machine. Let's use superscript m to express this component.

2) The signal reaching the CogniSense detector directly or indirectly via all the paths except through machine M, which remains static considering the time frame of the observation for capturing the machine signature. Let's use superscript d to express this component.

Using this convention, the net signal at two observation points can be expressed by the following:

$$h_1(A_1 \angle \phi_1) = A_1^d \angle \phi_1^d + A_1^m \angle \phi_1^m$$

$$h_2(A_2 \angle \phi_2) = A_2^d \angle \phi_2^d + A_2^m \angle \phi_2^m$$

Both the components could be expressed further as a sum of all the contributing signals assuming carrier frequency to be f as following:

$$A_1^d \angle \phi_1^d = \sum_{i=1}^{n} a_1^i e^{j(2\pi ft + \phi_1^i)} = A_1^d e^{j(2\pi ft + \phi_1^d)}$$

$$A_2^d \angle \phi_2^d = \sum_{i=1}^{n} a_2^i e^{j(2\pi ft + \phi_2^i)} = A_2^d e^{j(2\pi ft + \phi_2^d)}$$

$$A_1^m(t) \angle \phi_1^m(t) = \sum_{i=1}^{n} a_1^i e^{j(2\pi ft + \phi_1^i)} = A_1^m(t) e^{j(2\pi ft + \phi_1^m(t))}$$

$$A_2^m(t) \angle \phi_2^m(t) = \sum_{i=1}^{n} a_2^i e^{j(2\pi ft + \phi_2^i)} = A_2^m(t) e^{j(2\pi ft + \phi_2^m(t))}$$

If signals picked up at the two points are fed directly to the phase detector, the output phasor could be expressed by the following:

$$\frac{h_1(A_1 \angle \phi_1)}{h_2(A_2 \angle \phi_2)} = \frac{A_1^d e^{j\phi_1^d} + A_1^m(t) e^{j\phi_1^m(t)}}{A_2^d e^{j\phi_2^d} + A_2^m(t) e^{j\phi_2^m(t)}}$$

$$\frac{h_1(A_1 \angle \phi_1)}{h_2(A_2 \angle \phi_2)} = \left( \frac{1 + \frac{A_1^m(t)e^{j\phi_1^m(t)}}{A_1^d e^{j\phi_1^d}}}{1 + \frac{A_2^m(t)e^{j\phi_2^m(t)}}{A_2^d e^{j\phi_2^d}}} \right) \left( \frac{A_1^d e^{j\phi_1^d}}{A_2^d e^{j\phi_2^d}} \right)$$

In the above equations, it is observed that for the resulting signal to be sensitive to the motion of the machine, the signal contribution 1) coming from all the paths through machine should not be insignificant compared to the signal contribution 2) coming from the rest of the static paths in the environment in order to be observed after digitization. Because the volume occupied by a target machine is going to be very small compared to the whole volume covered by the reach of the radio signal transmitted, signal paths crossing through a target machine will be very small compared to the rest of the signal paths in the environment. So, the net signal at any observation point in the coverage area is going to be highly saturated by the signal contribution 2); which makes it very difficult to observe the contribution of 1) in the presence of 2). Applying any form of signal amplification is going to amplify both the components indiscriminately as both falls in the same signal bandwidth, hence this option is straight away ruled out.

However, as mentioned earlier, in order to separate component 1) which is very miniscule compared to 2), we take the advantage of the fact that component 2) is static and it is only the component 1) which is time varying due to the motion of the target object. So, we filter out the effect of the static part 2) by AC coupling the output signals of the phase detector of P(t) & G(t) before digitization, which may be performed by placing a capacitor in series or by using the inbuilt functionality of the oscilloscope (as illustrated in FIG. 4 by the AC coupling components 172, 174).

Apart from that, the sum of both the components 1) & 2) should be greater than the sensitivity level of the phase detector, which in one particular example use case is −65 dbm. If the component 1) is smaller in magnitude compared to the inherent noise of the phase detector, then the motion signature will be lost in the electronic noise before reaching the digitization stage. The strength of the motion signal compared to the static background signal can be improved in an environment by having more obstacles due to the increase in multipath signals. More scattering, diffraction or reflection due to obstacles in the environment increases the amount of signal passing through the target machine, and hence improves the sensitivity of the CogniSense detector.

Further, the relative placements of the Transmitter, Machine and the CogniSense device can also significantly affect the effectiveness of our methodology. After crunching the RF signal by the machine, the machine becomes the omnidirectional source of the machine modulated RF signal. So the strength of the modulated signal will fall with the square of the distance from the machine, hence the CogniSense device should be placed as close as possible to the machine in order to minimize the distance $d_{M\text{-}CS}$. On the other hand, the distance between the Transmitter and the CogniSense $d_{Tx\text{-}CS}$ should be increased in order to decrease the static component of the RF signal; which means the transmitter should be placed as far as possible from CogniSense, while keeping its distance from the machine same. This is discussed later with reference to FIG. 8.

Figure 5:
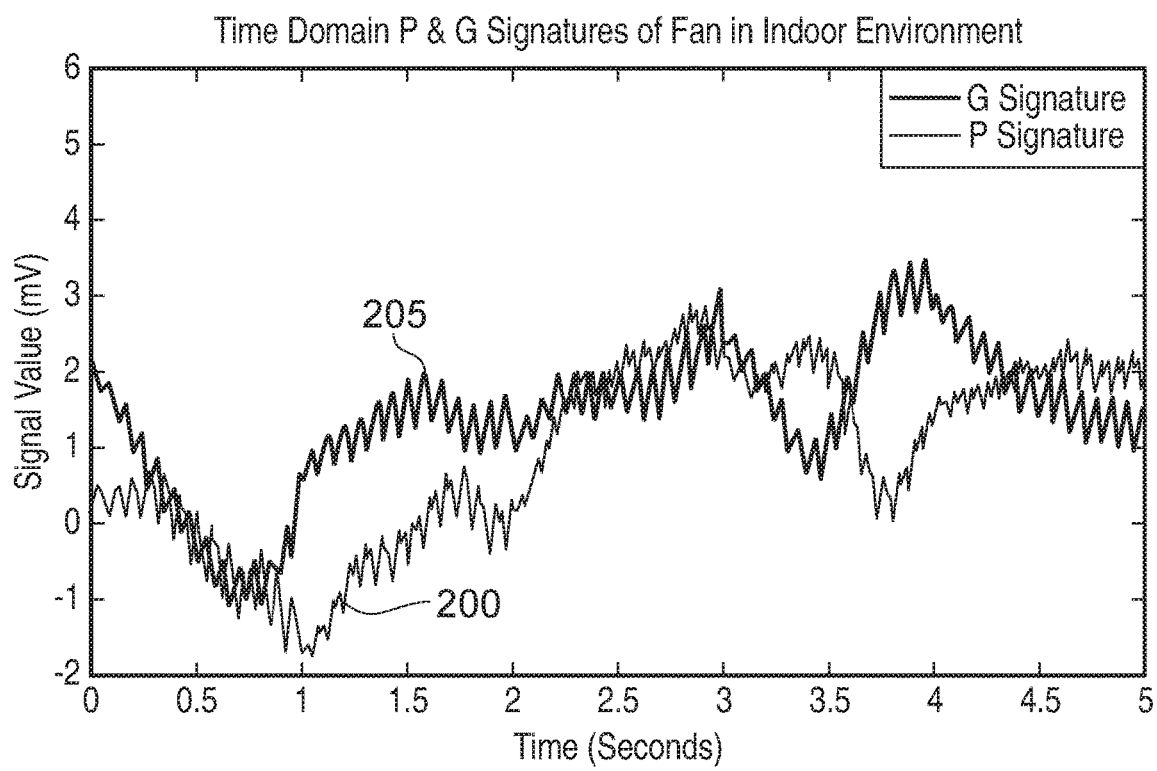
FIG. 5 is a graph illustrating time domain signatures derived from phase and amplitude analysis in accordance with one embodiment.

FIG. 5 is a graph illustrating time domain P and G signatures considering the example of a target machine that is a fan placed in an indoor environment. The P signature is shown by the graph 200 and the G signature by the graph 205. The slow time based variations in the signals are due to arbitrary movements within the environment, whilst the more high speed variations in the signal are representative of the speed of the fan. To provide for easier analysis of the speed of the components, it is useful to generate frequency domain signatures, and these are shown by way of example in FIGS. 6A to 6C. Again each figure shows both a P signature and a G signature, but the x axis plots frequency rather than time. In the frequency domain, the signal value consists of both amplitude and phase, both of which hold different information. In the example shown in FIGS. 6A to 6C, amplitude is plotted since for a machine with a single moving part the phase information does not generally have useful additional information. However, in a many-component machine the phase spectrum would for example add additional information by exhibiting how parts are moving relative to each other, which could be useful for monitoring the synchronisation of components.

Figure 6A:
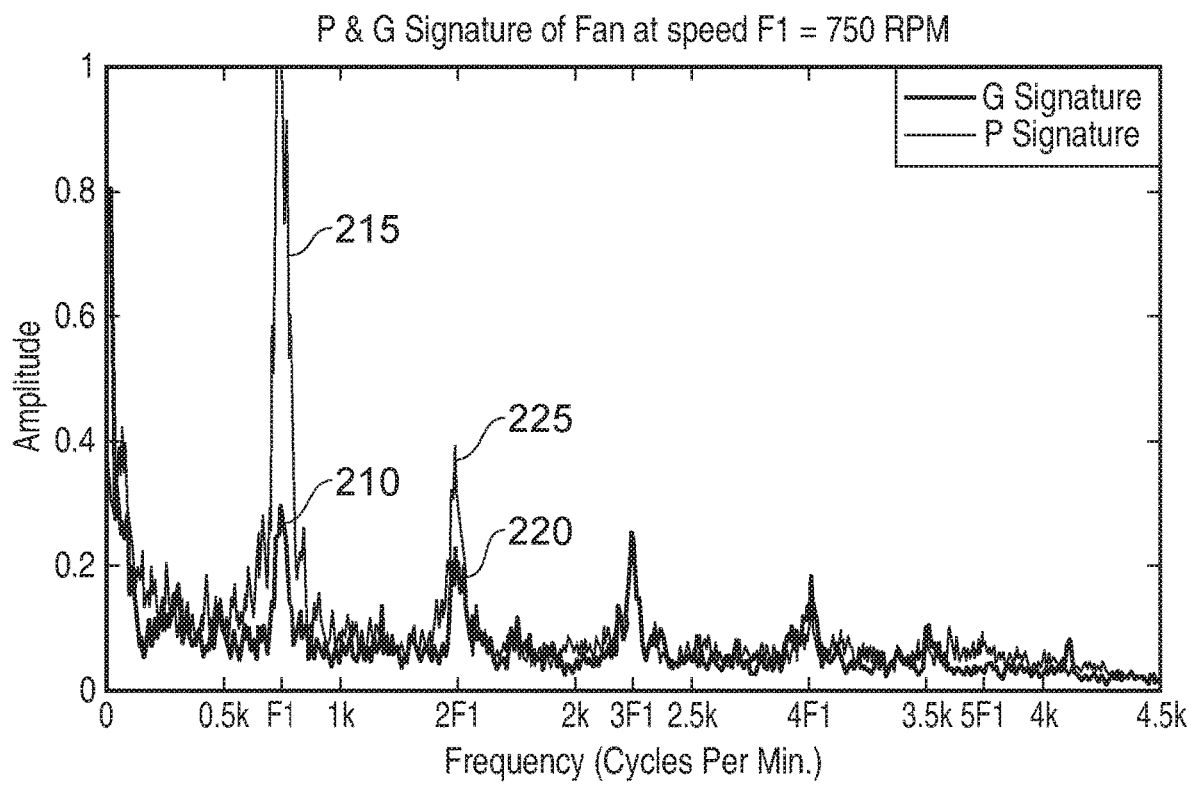
FIGS. 6A to 6C are graphs illustrating frequency domain signatures based on phase and amplitude analysis in accordance with one embodiment.
Figure 6B:
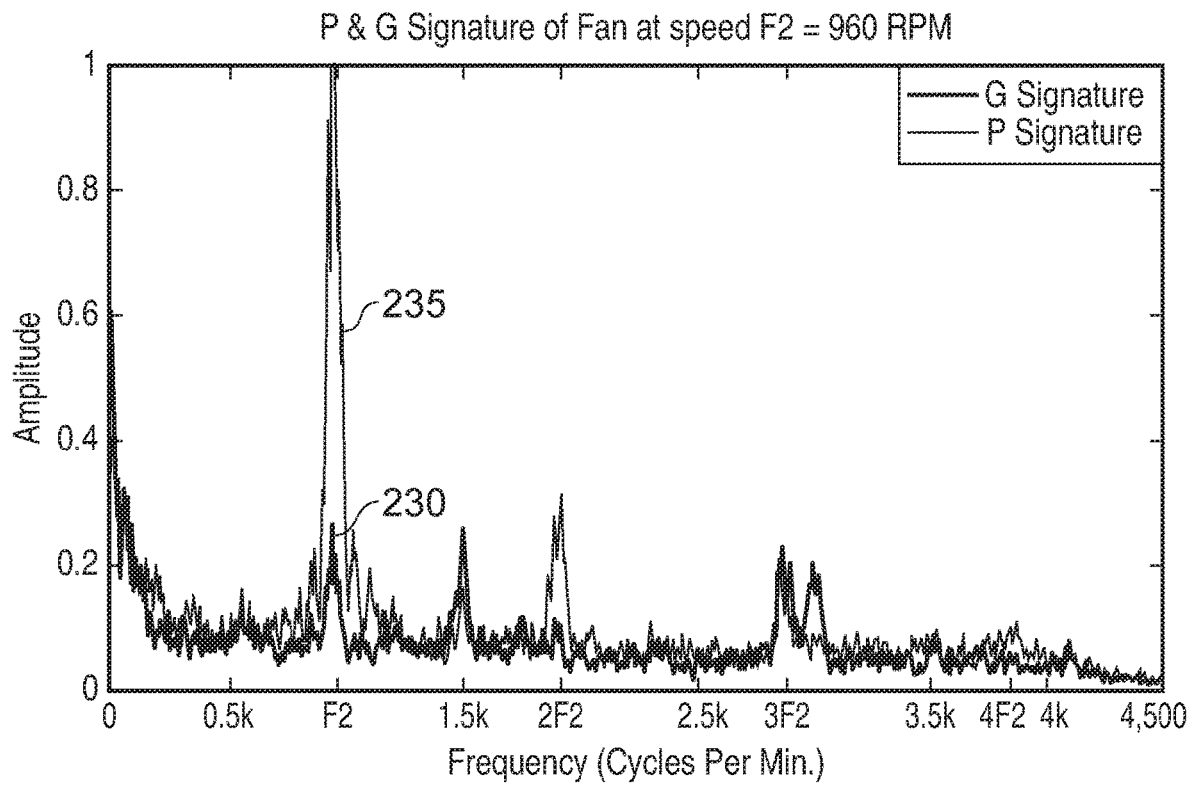
Figure 6C:
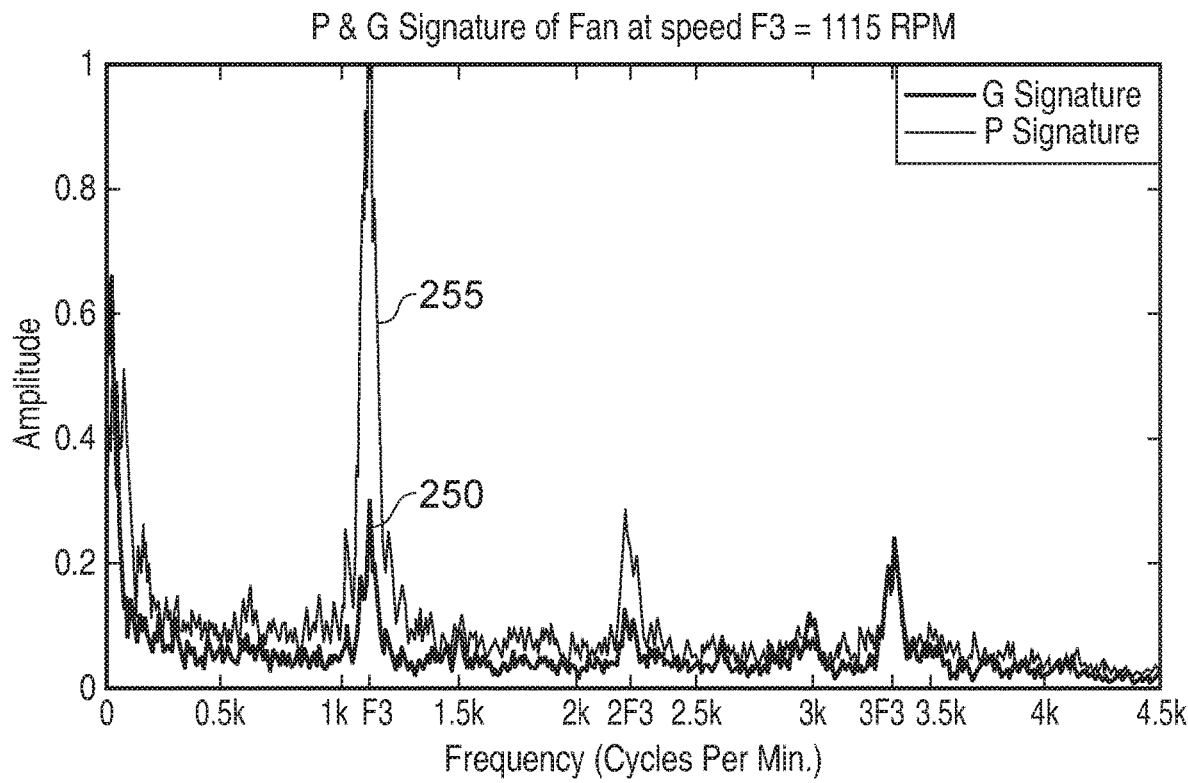

In FIGS. 6A to 6C, the amplitude represents the amplitude of the G component and the P component, and effectively reflects the intensity of interaction of the associated moving component of the machine with the RF signal.

In FIG. 6A, it is assumed that the target machine is a fan operating at 750 rpm, and this results in the main spikes 210, 215 observed in the G and P signatures. As discussed earlier, any periodic signal which is not sinusoidal will produce multiple harmonics, and these are also seen in FIG. 6A (see for example the harmonic exhibited by the spikes 220, 225).

FIG. 6B illustrates the equivalent frequency domain signatures when the fan changes state so as to run at 960 rpm. It can be seen that that speed of operation of the fan is clearly detectable from the spikes 230, 235 in the P and G signatures, in much the same way as the operating speed of the fan in FIG. 6A was determinable from the spikes 210, 215. Similarly, as shown in FIG. 6C, when the operating state of the fan is changed so that it now operates at 1115 rpm, this causes the corresponding frequency domain motional signatures to change, so that the main spikes 250, 255 correspond to that operating speed.

Whilst the frequency domain spectrums shown in FIGS. 6A to 6C relate to a target machine with only a single moving part, the same techniques can be used for machines with multiple moving parts. When the process is extended to multi-component machines, it is possible that there will be various overlapping spikes observed in the frequency domain spectrum, and signal processing techniques can then be employed to extract the various spikes, in order to determine which spikes correspond to which machine components.

Figure 7A:
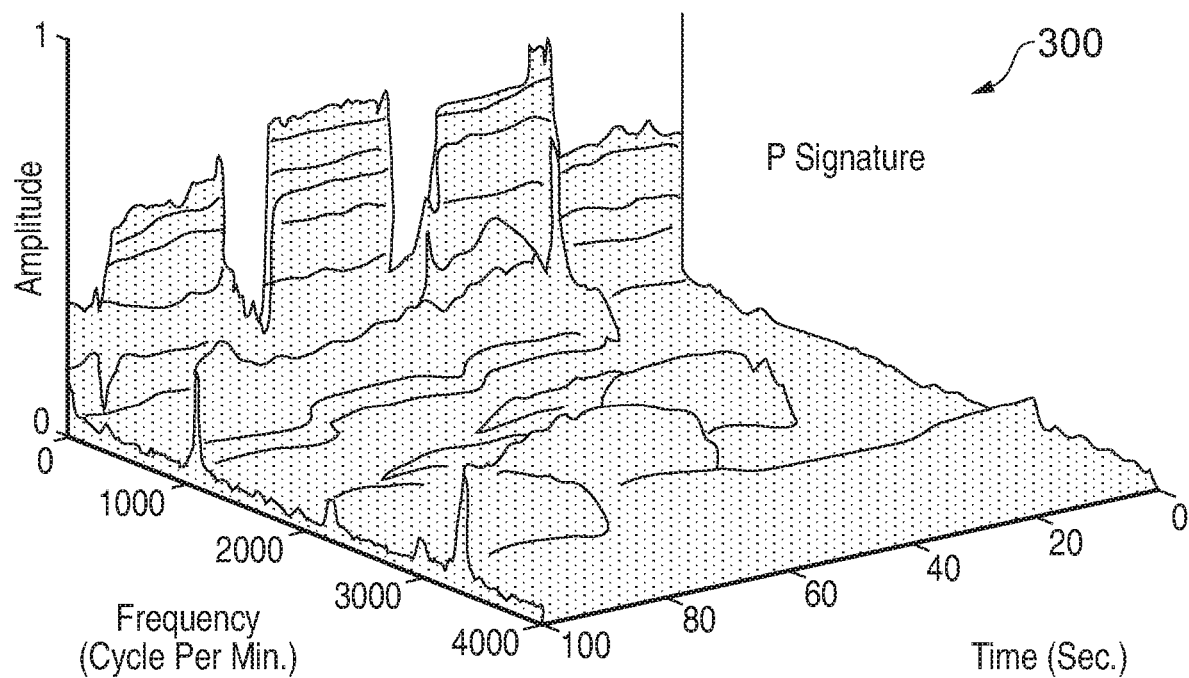
FIGS. 7A and 7B illustrate frequency domain signatures based on phase and amplitude analysis, respectively, and extending through time.
Figure 7B:
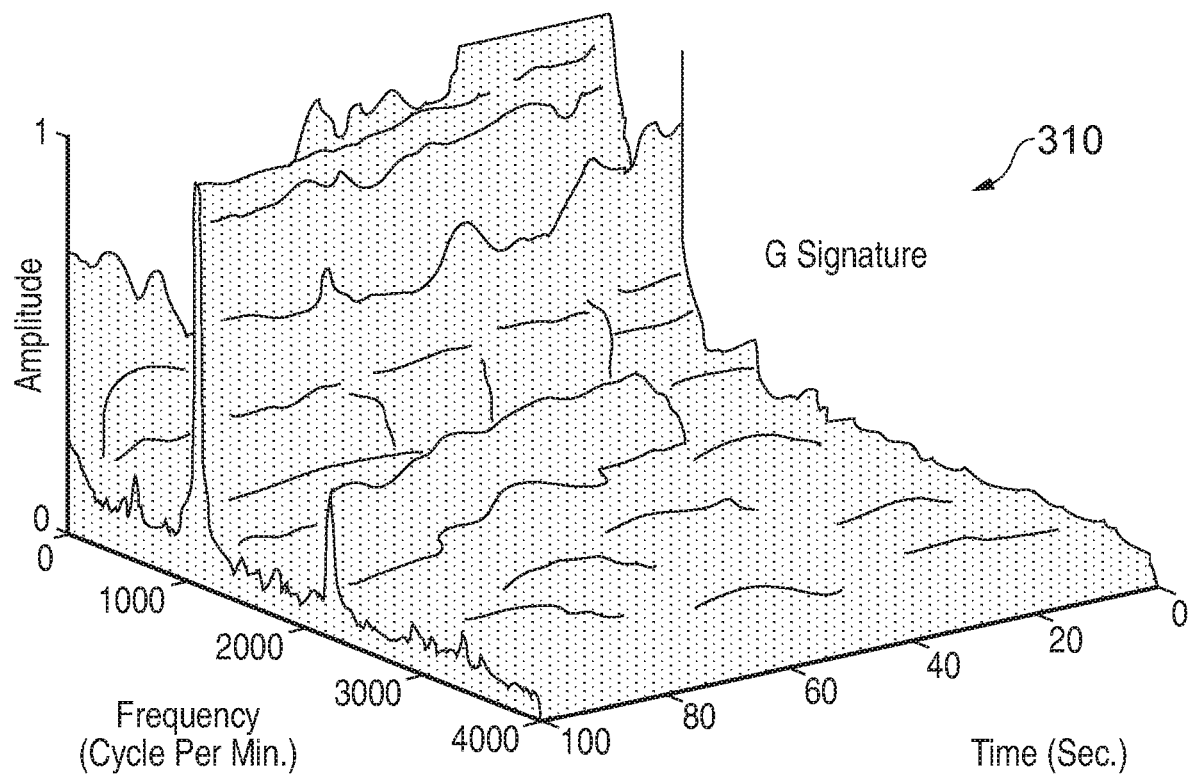

The frequency domain spectrums such as shown in FIGS. 6A to 6C can also be plotted in a third dimension, namely time, as illustrated schematically in FIGS. 7A and 7B for the P signature and G signature, respectively. The peaks in amplitude at very low frequencies can be associated with background noise, whereas the spikes at other frequencies can be associated with movement of the moving part of the target machine, in this example the target machine being a fan as per the earlier example. In these examples, it is assumed that the fan changes its operating speed at two discrete points in time, and these changes can be seen from the way in which the spikes alter frequency as time progresses.

Figure 8:
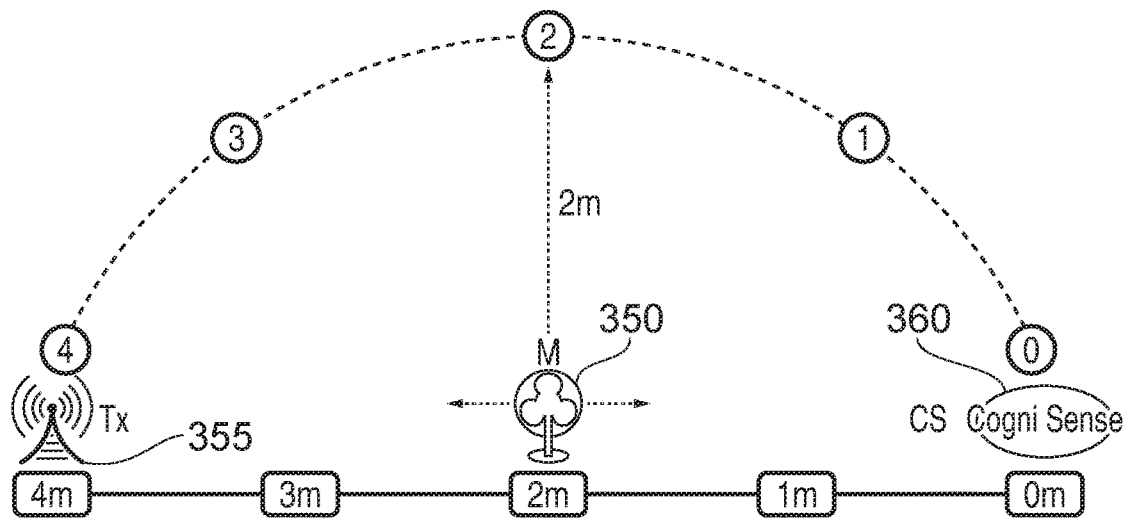
FIG. 8 is a diagram schematically illustrating steps that can be taken to improve sensitivity of signature detection in accordance with one embodiment.

FIG. 8 is a diagram used to discuss the effect of relative placements as the machine 350 is moved from the CogniSense detector 360 to the transmitter 355 along a straight line, and/or the transmitter 355 is moved along the arced line whilst keeping a constant distance from the machine 350. Whilst keeping the transmitter 355 and the CogniSense detector 360 fixed, and moving the machine 350 on the straight line, signatures can be captured at the various five marked locations separated by one meter. The results indicate that the technique of the described embodiments is more effective when the machine 350 is closer to the detector 360. As the machine goes away from the detector 360 and comes closer to the transmitter 355, then after midway the sensitivity starts increasing again, due to the fact that the machine 350 receives more flux of the RF signal, which after being RF crunched amplifies the multipath effect.

If instead the CogniSense detector 360 and the machine 350 are retained fixed in their positions shown in FIG. 8, and the transmitter 355 is moved along the arc in order to capture the signature of the machine at the five marked locations, it can be seen that the distance between the transmitter 355 and the machine 350 remains at two meters throughout that process, but the distance between the transmitter 355 and the CogniSense detector 360 increases gradually as the transmitter is moved from location 0 through to location 4. At position 0, the transmitter and the CogniSense detector are placed very closely together and as a result the static component of the signal coming directly from the transmitter is far stronger than the time varying component from the interaction with the machine 350, and hence it is very difficult to extract a meaningful signature. However, as the transmitter moves away from the CogniSense detector 360 the sensitivity increases as predicted. Hence, by appropriate positioning of the transmitter, machine and CogniSense detector, it is possible to obtain motional signatures providing detailed information about the motion of the moving parts of the machine. Generally is preferable to place the CogniSense detector much closer to the target machine than it is to the transmitter, so as to maximise the proportion of the resultant received signal that is due to the time varying signal path components. In addition it is generally preferable to place the transmitter as far as possible relative to the detector so as to reduce the contribution to the received RF signal from the static multipath signal components.

As mentioned earlier, the above described technique can also be applied in a multi-spectral mode, where motional signatures are obtained for a variety of different transmit frequencies. Whereas the general technique described up till now can be performed using a dedicated transmitter, or using existing transmitted RF signals that happen to pervade the environment containing the machine, when adopting a multi-spectral mode of operation it will typically be beneficial to provide a dedicated multi-spectral transmitter. The operation of such a transmitter in one embodiment is described with reference to the flow diagram of FIG. 9. Prior to performing the process of FIG. 9, a setup stage may be adopted in order to determine the range of frequencies to be used in the multi-spectral mode. For example, considering a broadband frequency generator, a binary search method can be employed to narrow down to the frequency region sensitive to the target machine. After such a process, the multi-spectral mode of operation can be configured to operate within that narrowed down frequency range, but certain trigger conditions could cause the binary search method to be reperformed in order to reassess the range of frequencies to be used. One such trigger condition may be a determination that the machine signature is drifting for some reason (which might be due to a state-transition in the operation of one or more components or due to the development of a fault in one or more of the moving components). Assuming the frequency range to be used has been determined, then at step 400 a parameter i is set equal to 0, whereafter at step 405, carrier frequency i is selected. In particular, the frequency range to be used may be divided into a number of separate frequencies, and those separate frequencies can be associated with values of i running from 0 to $i_{MAX}$.

Once the carrier frequency i has been selected, then the transmitter is arranged to transmit the carrier frequency i at step 410, and will continue to transmit that carrier frequency until it is determined at step 415 that a trigger has been received to change the frequency. Whilst in one embodiment this could be merely the elapse of some predetermined timer, to cause the multi-spectral transmitter to step through the frequencies at predetermined time intervals, in another embodiment the trigger is actually issued by the CogniSense detector circuitry, so that the detector circuitry has control over when the frequency is changed.

Once a trigger is received at step 415, it is then determined at step 420 whether the parameter i is equal to $i_{MAX}$. If it is not, then the value of i is adjusted at step 425, in one embodiment this merely involving incrementing the value i. Thereafter, at step 430 the motional signature detector is notified that an adjustment in the transmission frequency is taking place. The process then returns to step 405.

When it is determined at step 420 that i has reached its maximum value, then it is determined at step 435 whether a further iteration has been instructed, and if so the process returns to step 400. Otherwise, the process waits at step 435 until a further iteration is instructed.

In one embodiment, the iterations will be repeated on an ongoing basis for continuous monitoring of the machine. However, in some embodiments duty-cycling considerations can be taken into account in order to ensure that large amounts of redundant data are not generated. For example, in one embodiment the iteration repetition frequency could be selected having regard to the monitoring resolution required in terms of alert-time, i.e. how quickly it is desired to raise an alert if certain changes in the motion signatures are detected. It may also be appropriate to change the repetition frequency depending on the speed at which the machine is going through state transitions. Accordingly, the duty-cycling of the monitoring may be automatically adapted depending on the rate of drift in the machine signature.

It should also be noted that the various frequencies within the frequency range do not need to be selected in an increasing or decreasing order within a particular iteration, and any appropriate technique can be used to determine the next transmit carrier frequency to be used within the range of frequencies employed by the multi-spectral approach.

Figure 10:
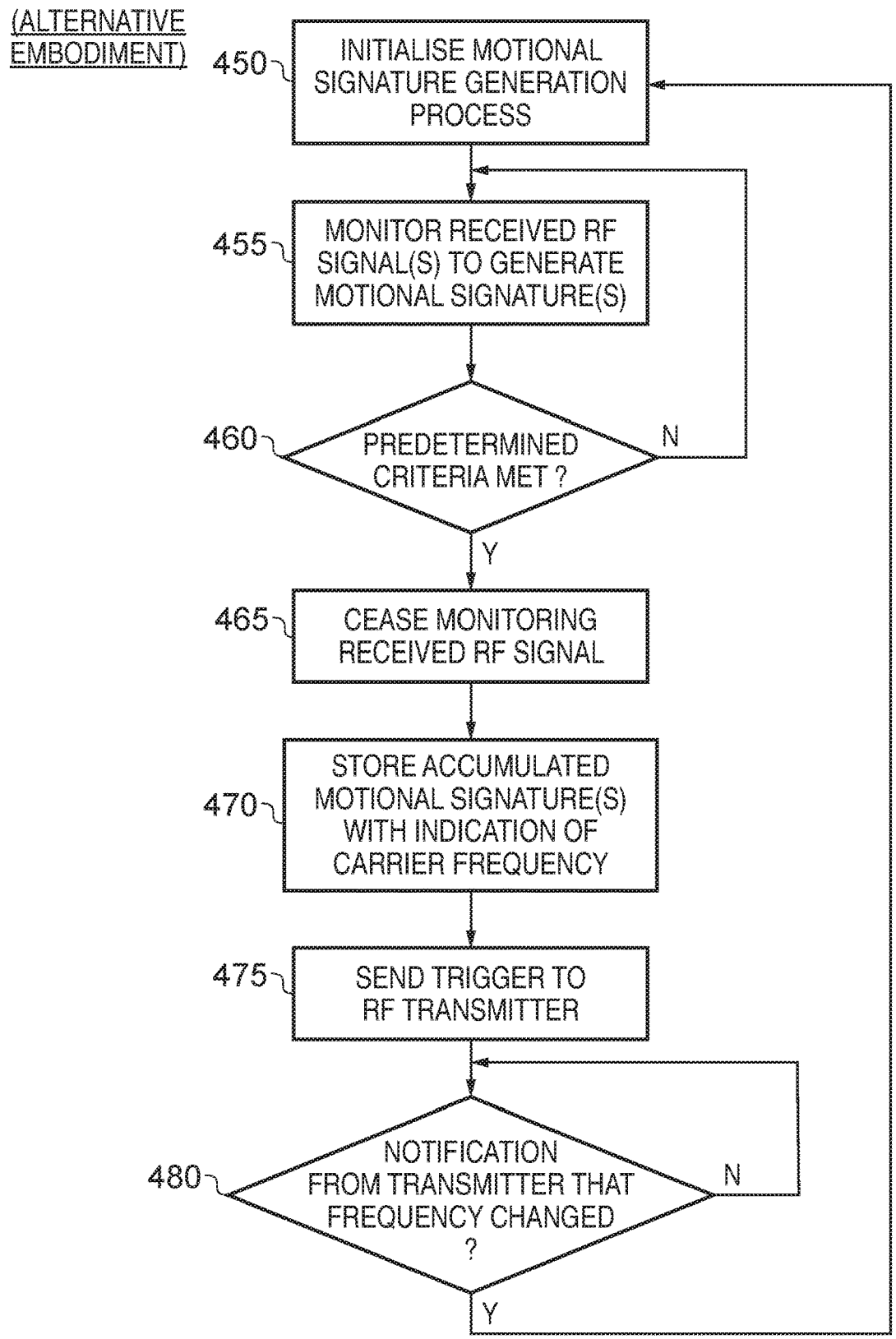
FIG. 10 is a flow diagram illustrating the operation of the motional signature detector in a multi-spectral mode in accordance with one embodiment.

FIG. 10 is a flow diagram illustrating the operation of the motional signature detector 25 in the multi-spectral mode of operation. At step 450, the motional signature generation process is initialised, whereafter at step 455 the detector monitors the received RF signal or signals in order to generate one or more motional signatures. At step 460, the detector then determines whether one or more predetermined criteria are met. The detector may be arranged to assess this criteria in a number of ways. For example, in one embodiment each transmit frequency should be used for long enough to satisfy the earlier mentioned Nyquest criteria for digitization, i.e. the CogniSense detector sampling frequency is at least twice the highest frequency of the machine. The time-length of the data capturing window for each carrier frequency determines the signature quality as this is effectively equal to the FFT window size. Increasing the FFT window size increases the resolution of the signature on the frequency axis. By implementing a sliding window FFT as discussed earlier, the oldest data gets continually pushed out from one end as new data is pushed in from the other side while keeping the FFT window size constant.

Whatever criteria is applied at step 460, the detector continues to monitor the received signal and generate the resultant motional signature(s) until it determines that the predetermined criteria has been met, whereafter the process proceeds to step 465 where the detector ceases monitoring the received RF signal. At step 470, it stores the accumulated motional signature or signatures along with an indication of the carrier frequency that was used to generate those motional signatures, and thereafter at step 475 sends a trigger to the RF transmitter.

Figure 9:
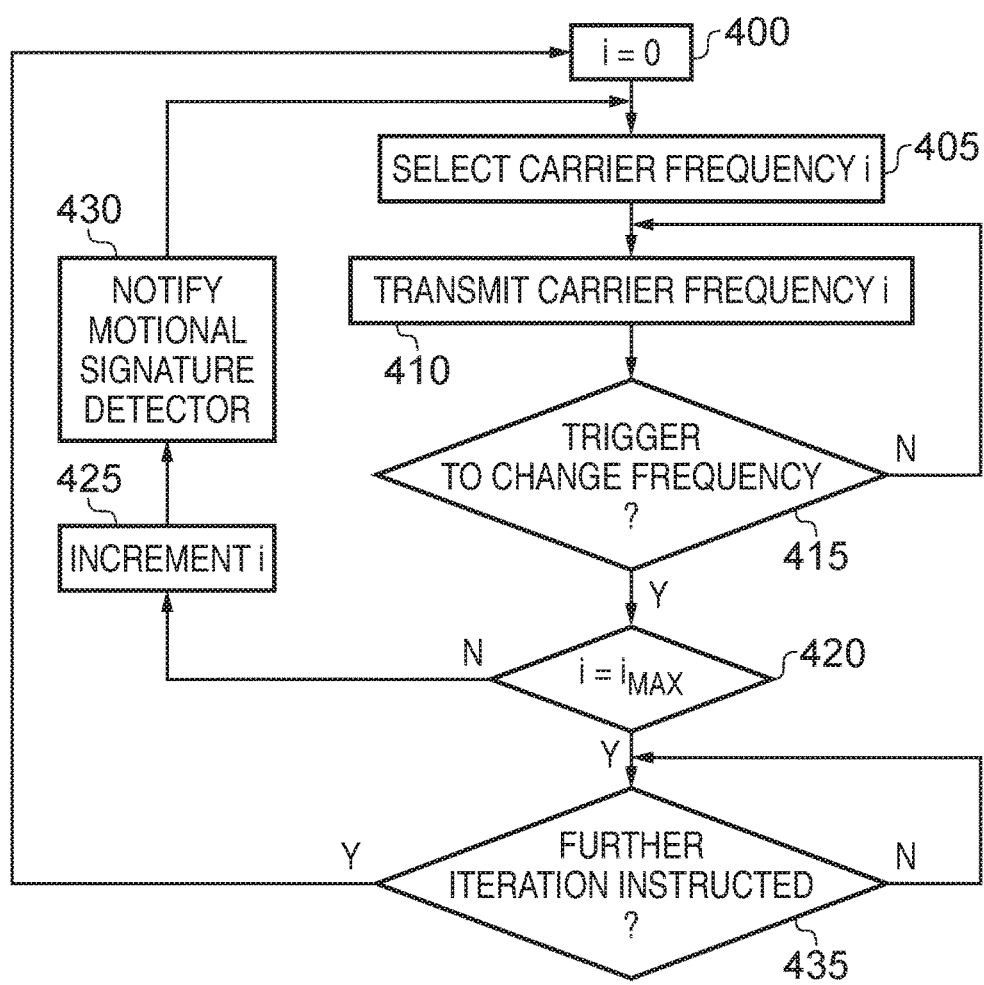
FIG. 9 is a flow diagram illustrating the operation of a multi-spectral transmitter in accordance with one embodiment.

As will be apparent from the earlier described FIG. 9, that trigger will then cause the transmitter to change its carrier frequency, whereafter it will notify the motional signature detector at step 430. Hence, at step 480 in FIG. 10, the detector awaits receipt of that notification from the transmitter, and once the notification is received, the process then returns to step 450.

By such an approach, it will be appreciated that a set of different motional signatures can be acquired for a variety of different transmit signal frequencies, hence enabling motional signature information about a variety of different components within the machine to be obtained with appropriate sensitivity.

Figure 11:
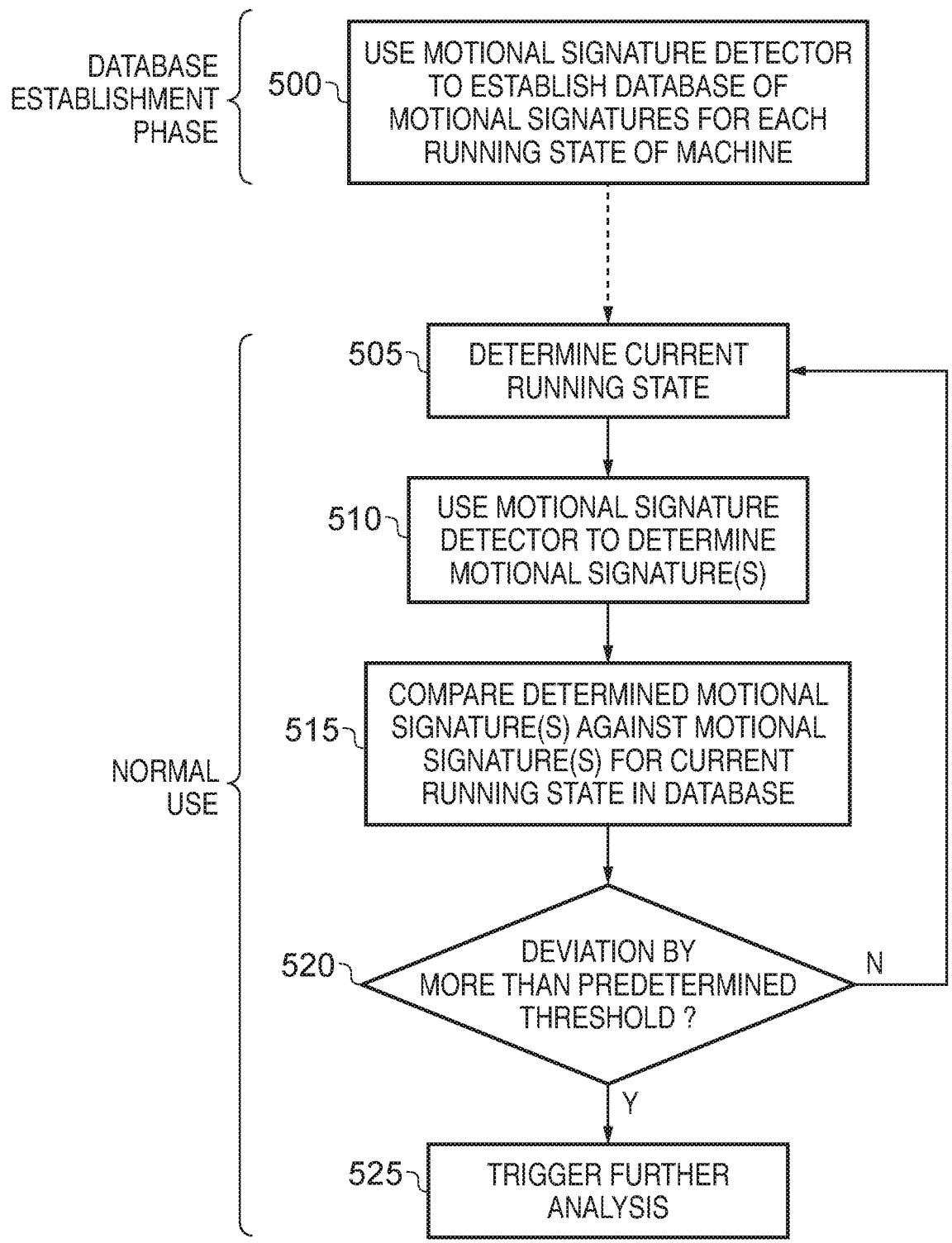
FIG. 11 is a flow diagram illustrating how the motional signature detector may be used in accordance with one embodiment to detect potential problems with the machine using the motional signatures detected.

Irrespective of whether such a multi-spectral mode is used or not, the acquired motional signatures can then be used to detect situations where there are potential issues with the moving components of the machine. This is illustrated schematically in FIG. 11.

In particular, at step 500 the motional signature detector is used to establish a database of motional signatures for each running state of the machine. Once this database has been produced, then on an ongoing basis during normal use of the machine the detector can look for anomalies in the motional signatures. In particular, during normal use the process proceeds to step 505 where the current running state is determined, whereafter at step 510 the motional signature detector is used to determine the motional signature or signatures of the machine whilst running in that state. These determined motional signatures are then compared against the motional signatures in the database at step 515 in order to determine whether the motional signatures are as expected.

In particular, at step 520, it is determined whether the motional signatures determined at step 510 deviate from the corresponding signatures in the database by more than a predetermined threshold. If not, the process merely returns to step 505, but if such a deviation is observed, then the process proceeds to step 525 where further analysis is triggered. This could for example raise an alert signal to a user causing the user to further investigate the issue. It will be appreciated that there are various reasons that may cause the trigger to be generated. For example there may be one faulty component whose motion accordingly changes relative to the motion observed in the corresponding signature in the database, and by comparing the detected signature with the database of signatures, that faulty component can be readily identified. Alternatively, it may be the case that all of the components in a multi-component system are drifting relative to the signatures in the database in a proportional manner. This could for example be due to one misaligned component having a knock-on effect to other interconnected components in the machine.

From the above described embodiments, it will be appreciated that a technique has been described for capturing motional signatures that correspond to the physical movements of moving parts of a machine using electromagnetic signals such as radio signals. The underpinning insight of the technique is that any physical movement imprints its footprint on an RF signal provided the object's material is sensitive enough to the subjected signal frequency. As this footprint could be too miniscule to be observed directly, a technique is described that exploits multipath propagation to seek to filter out multipath components that do not provide the footprint information. It has been demonstrated through evaluation with home appliances that the captured signature is characteristic of the machine in a particular running state, and it can be acquired from a distance of several meters, and even if the machine is obstructed by walls.

The described technique can be used to monitor the rotational speeds of all of the internal components of a complicated machine non-invasively without instrumenting it.

Further, since the various moving components of the machine are interconnected, so the relative phases of their cyclical motions are also characteristic of the functional integrity of the machine since, in a mechanical system, synchronisational coordination amongst its various parts or subsystems may be very critical for the functional accomplishment of the machine. Misalignment of a single component in a machine can cascade to motional drift in all of the other interacting components. Using the described technique herein, relative phases of movements of different components can be captured, which reflects the functional integrity of the machine. Further, the faulty component can be pinpointed.

In one embodiment, the technique has been implemented using a PC based oscilloscope and Matlab. However, the detector system does not require much computational resources, and so can easily be implemented in a lightweight module making for a very portable, as well as highly cost effective, solution.

Whilst in one embodiment a dedicated radio source is used for generating the transmitted RF signal, as discussed earlier ambient RF signals from other sources, such as TV or Wi-Fi, can also be used in some embodiments.

The CogniSense detector of one example embodiment takes advantage of an insight about mechanical systems, namely that its components are performing cyclical movements, and machines can be holistically thought of as a combination of static and moving components, where moving components are coupled together to accomplish some function. The described technique uses multipath propagation to modulate and extract the motional signatures of the parts of the machine.

The described techniques involve use of a transmitter and a receiver operating simultaneously, and which can be placed strategically in a given environment considering the location of the target machine to be monitored in order to enhance the sensitivity. The transmitter and receiver need not be located together (indeed they will typically be spatially separated from each other), nor do they require any specific positioning. Further, the transmit and receive operations do not need to be synchronised. Indeed, in the described embodiments the transmitter is completely detached from the receiver of the CogniSense detector, and the CogniSense detector can in one example arrangement use any ambient radio signal present in the environment as well, thus not requiring any transmitter explicitly.

In the described embodiments, the received signal is evaluated with reference to a comparison signal, which can in one embodiment be a reference signal generated using a local source. However, the oscillator drift can be a potential issue in this case, as it may in some cases destroy the motional signature of the machine in the captured RF signal. This is because most of the mechanical machines run typically between 500-90,000 RPM (Revolutions Per Minute) or 8-1500 Hz, which is very much in the range of the tolerance limit of typically used oscillators. Hence in one embodiment, the comparison signal is instead formed by a signal picked up by a further antenna separated by a given distance from the main antenna (which in one embodiment is chosen so as not to be insignificant compared to the wavelength). The fact that the signal captured by a further antenna can be effectively used as a reference signal is based on the insight derived from the underlying principle of "Multipath Modulation" as discussed earlier herein.

The comparison signal received by the further antenna will in one embodiment provide exactly the same carrier frequency as the main signal as both are emanating from the same source, namely the transmitter. This overcomes the above-mentioned issues resulting from the oscillator drift. In addition to this, the comparison signal picked by the further antenna will also have the same machine-modulated signature in its amplitude and phase as in the main signal, but to a different extent because both the antennae are picking up the signals from two different locations. The "Multipath Modulation" implies that it is highly unlikely that the altered signal paths in a multipath environment will result in the same values of amplitude and phase of the signal at an observation point. Further, it is even more unlikely that it can remain unchanged at two observation points picked up by the two antennae, and it is also very unlikely that it can change by the same amount at two observation points picked up by the two antennae. Thus, because the motional signature is modulated in both the signals to different extents, operations like ratio of their amplitudes, or difference of their phases, will preserve the motional signature, which can hence be extracted through further processing.

The techniques described herein provide a mechanism for removing the static part of the signal contributed from the non-time-varying signal paths, which are often far more dominating compared to the time-varying signal, because a target machine will typically occupy a very small volume in the whole coverage region of the RF signal.

The described techniques also enable filtering out the signature effects contributed by surrounding movements, or other interfering RF devices, in order to extract the motional signature of the target machine.

The techniques described herein can be used to monitor many machines using a single CogniSense detector if desired.

Further the described techniques are non-invasive to the machine being monitored, and do not require any specific placement of the detector relative to the machine.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
    receiving circuitry configured to receive a signal formed from a plurality of multipath signal components, including a first set of multipath signal components that have been subjected to modulation by interaction with at least one moving part of a target machine, the first set of multipath signal components having time varying signal paths due to the interaction with said at least one moving part;
    evaluation circuitry configured to generate, for at least one property of the received signal, an evaluation signal;
    modification circuitry configured to produce a modified evaluation signal by applying a removal operation to at least partially remove from said evaluation signal a contribution to that evaluation signal from the plurality of multipath signal components whose associated signal paths are non-time-varying; and
    processing circuitry configured to perform one or more processing operations on the modified evaluation signal to produce a motional signature indicative of the motion of said at least one moving part.

2. The apparatus as claimed in claim 1, wherein the evaluation circuitry is arranged to generate the evaluation signal to be indicative of variation between values of said at least one property of the received signal and corresponding values of said at least one property of a further signal.

3. The apparatus as claimed in claim 2, wherein:
    the receiving circuitry comprises a first receiving circuit configured to receive said signal and a second receiving circuit, separated from the first receiving circuit, configured to receive said further signal, said further signal also formed from a plurality of multipath signal components, including a second set of multipath signal components that have been subjected to modulation by interaction with said at least one moving part.

4. The apparatus as claimed in claim 3, wherein the first receiving circuit and the second receiving circuit are separated by a distance sufficient to ensure a difference between said signal and said further signal.

5. The apparatus as claimed in claim 2, further comprising:
    reference signal generation circuitry configured to generate a reference signal used as said further signal.

6. The apparatus as claimed in claim 2, wherein said at least one property of the received signal comprises an amplitude and the evaluation circuitry is arranged to generate said evaluation signal having a signal value indicating a ratio of the amplitudes of the received signal and the further signal.

7. The apparatus as claimed in claim 2, wherein said at least one property of the received signal comprises a phase and the evaluation circuitry is arranged to generate said evaluation signal having a signal value indicating a difference of the phases of the received signal and the further signal.

8. The apparatus as claimed in claim 2, wherein the evaluation circuitry comprises phase and/or gain detector circuitry arranged to receive as inputs both the received signal and the further signal.

9. The apparatus as claimed in claim 1, wherein said modification circuitry comprises AC coupling circuitry.

10. Theme apparatus as claimed in claim 9, wherein said AC coupling circuitry comprises capacitor circuitry located in series between an input and an output of the modification circuitry.

11. The apparatus as claimed in claim 1, wherein the modification circuitry is incorporated within the processing circuitry and applies a DC filtering operation on the evaluation signal after digitization of the evaluation signal.

12. The apparatus as claimed in claim 1, wherein the first set of multipath signal components have cyclical time varying signal paths due to the interaction with said at least one moving part, which causes said first set of multipath signal components to contribute a cyclical variation to the values of said at least one property of the received signal.

13. The apparatus as claimed in claim 1, wherein said processing circuitry is arranged to perform one or more filtering operations to generate said motional signature from the modified evaluation signal.

14. The apparatus as claimed in claim 1, wherein the processing circuitry is arranged to generate said motional signature in at least one of a frequency domain and a time domain.

15. The apparatus as claimed in claim 1, wherein the received signal is an electromagnetic signal.

16. The apparatus as claimed in claim 15, wherein the received electromagnetic signal is an RF signal.

17. A method of generating a motional signature indicative of motion of at least one moving part of a target machine, comprising:
transmitting, by a transmitter, within an environment containing said target machine, a signal;
receiving a signal that is a version of the transmitted signal formed from a plurality of multipath signal components, including a set of multipath signal components that have been subjected to modulation by interaction with said at least one moving part, the set of multipath signal components having time varying signal paths due to the interaction with said at least one moving part;
generating, for at least one property of the received signal, an evaluation signal;
producing a modified evaluation signal by applying a removal operation to at least partially remove from said evaluation signal a contribution to that evaluation signal from the plurality of multipath signal components whose associated signal paths are non-time-varying; and
performing one or more processing operations on the modified evaluation signal to produce said motional signature.

18. The method as claimed in claim 17, wherein:
said receiving, generating, producing and performing steps are performed within detector circuitry; and
said detector circuitry is placed closer to the target machine than the transmitter used to transmit said signal.

19. The method as claimed in claim 18, wherein the transmitter is located relative to the detector circuitry so as to reduce a contribution to the received signal from the plurality of multipath signal components that are not in said set of multipath signal components.

20. The method as claimed in claim 17, wherein the transmitted signal has a carrier frequency selected having regard to at least one property of said at least one moving part.

21. The method as claimed in claim 17, wherein:
said transmitting step comprises transmitting a series of signals having different carrier frequencies; and
said receiving, generating, producing and performing steps are performed for each of a series of received signals corresponding to the series of transmitted signals, to produce said motional signature for each of the different carrier frequencies.

22. The method as claimed in claim 21, wherein:
said receiving, generating, producing and performing steps are performed within detector circuitry; and
said transmitting step is arranged to switch between the signals in said series of transmitted signals under control of the detector circuitry.

23. An apparatus comprising:
means for receiving a signal formed from a plurality of multipath signal components, including a set of multipath signal components that have been subjected to modulation by interaction with at least one moving part of a target machine, the set of multipath signal components having time varying signal paths due to the interaction with said at least one moving part;
means for generating, for at least one property of the received signal, an evaluation signal;
means for producing a modified evaluation signal by applying a removal operation to at least partially remove from said evaluation signal a contribution to that evaluation signal from the plurality of multipath signal components whose associated signal paths are non-time-varying; and
means for performing one or more processing operations on the modified evaluation signal to produce a motional signature indicative of the motion of said at least one moving part.

* * * * *